(12) United States Patent
Zhang

(10) Patent No.: US 8,402,272 B2
(45) Date of Patent: Mar. 19, 2013

(54) MASTER UNIT AND SLAVE UNIT

(75) Inventor: Yibo Zhang, Osaka (JP)

(73) Assignee: Panasonic Corporation, Osaka (JP)

( * ) Notice: Subject to any disclaimer, the term of this patent is extended or adjusted under 35 U.S.C. 154(b) by 135 days.

(21) Appl. No.: 13/119,015

(22) PCT Filed: Jul. 7, 2010

(86) PCT No.: PCT/JP2010/004440
§ 371 (c)(1),
(2), (4) Date: Mar. 15, 2011

(87) PCT Pub. No.: WO2011/010432
PCT Pub. Date: Jan. 27, 2011

(65) Prior Publication Data
US 2011/0173447 A1    Jul. 14, 2011

(30) Foreign Application Priority Data

Jul. 22, 2009  (JP) .................................. 2009-171626

(51) Int. Cl.
*H04L 9/32* (2006.01)
(52) U.S. Cl. ....................................................... 713/168
(58) Field of Classification Search ........................ None
See application file for complete search history.

(56) References Cited

U.S. PATENT DOCUMENTS

| | | | |
|---|---|---|---|
| 6,570,857 B1 * | 5/2003 | Haartsen et al. | 370/312 |
| 7,882,196 B2 * | 2/2011 | Fujii et al. | 709/208 |
| 2004/0119606 A1 | 6/2004 | Lee et al. | |
| 2004/0158333 A1 * | 8/2004 | Ha et al. | 700/3 |
| 2005/0125682 A1 | 6/2005 | Eguchi | |
| 2006/0080379 A1 * | 4/2006 | Song et al. | 709/200 |
| 2007/0226779 A1 * | 9/2007 | Yokomitsu et al. | 726/2 |

FOREIGN PATENT DOCUMENTS

| | | |
|---|---|---|
| JP | 7-325785 | 12/1995 |
| JP | 2004-215232 | 7/2004 |
| JP | 2005-514861 | 5/2005 |
| JP | 2005-167739 | 6/2005 |
| JP | 2005-196790 | 7/2005 |
| JP | 2008-154133 | 7/2008 |
| JP | 2009-94768 | 4/2009 |

OTHER PUBLICATIONS

International Search Report issued Aug. 10, 2010 in corresponding International Application No. PCT/JP2010/004440.
Takashi Matsunaka et al., "An approach for the authentication and key distribution method in the power line communication", Proceedings of the 2005 IEICE General Conference, Mar. 7, 2005, Tsushin 2, B-7-15, p. 169.

* cited by examiner

*Primary Examiner* — Cordelia Zecher
(74) *Attorney, Agent, or Firm* — Wenderoth, Lind & Ponack, L.L.P.

(57) ABSTRACT

Provided is a communication device which securely registers a slave unit. A secret address generation and setup section generates a secret address generator, and a secret address of the slave unit used temporarily instead of a unique address of the slave unit based on the secret address generator and identification information of the slave unit. A second communication section transmits to the slave unit a registration start notice containing the secret address generator by broadcast. A registration process section generates a registration authentication key; generates a unique key of the slave unit by transmitting/receiving, to/from the slave unit, unique key generation information encrypted using the registration authentication key; receives, from the slave unit, the unique address of the slave unit encrypted using the registration authentication key; and stores the identification information in association with the unique address and the unique key of the slave unit in the registration information storing section.

17 Claims, 25 Drawing Sheets

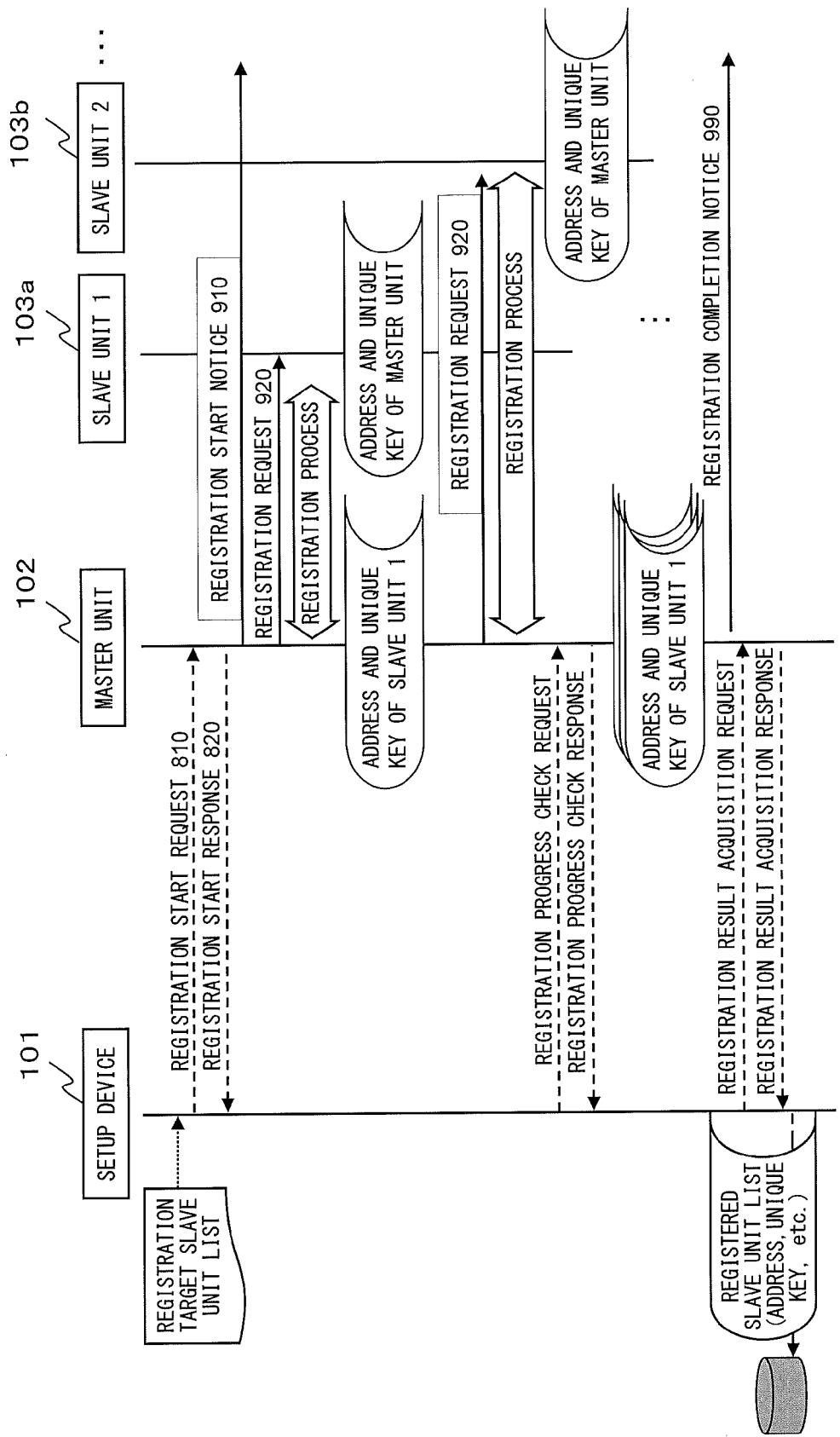
F I G. 6

F I G. 8

REGISTRATION START RESPONSE 820

| REGISTRATION EXECUTION/ NON-EXECUTION 821 |
|---|
| NUMBER OF ABNORMAL SLAVE UNIT 822 |
| ABNORMAL SLAVE UNIT INFORMATION LIST 823 |

REGISTRATION START REQUEST 810

| REGISTRATION EXECUTION TYPE 811 |
|---|
| SLAVE UNIT INFORMATION TYPE 812 |
| NUMBER OF SLAVE UNIT 813 |
| SLAVE UNIT INFORMATION LIST 814 |

FIG. 9

REGISTRATION START NOTICE 910
| REGISTRATION EXECUTION NUMBER 911 |
| REGISTRATION EXECUTION TYPE 912 |
| SECRET ADDRESS GENERATOR 913 |

REGISTRATION REQUEST 920
| REGISTRATION EXECUTION NUMBER 921 |
| REGISTRATION AUTHENTICATION KEY GENERATION ALGORITHM NUMBER 922 |
| ENCRYPTION ALGORITHM NUMBER 923 |
| REGISTRATION AUTHENTICATION KEY GENERATOR A 924 |

REGISTRATION RESPONSE 930
| REGISTRATION EXECUTION NUMBER 931 |
| REGISTRATION EXECUTION/NON-EXECUTION 932 |
| REGISTRATION AUTHENTICATION KEY GENERATOR B 933 |

CHALLENGE 940
| REGISTRATION EXECUTION NUMBER 941 |
| PLAIN TEXT CHALLENGE 942 |

CHALLENGE RESPONSE 950
| REGISTRATION EXECUTION NUMBER 951 |
| CIPHER TEXT CHALLENGE 952 |

KEY GENERATION REQUEST 960
| REGISTRATION EXECUTION NUMBER 961 |
| UNIQUE KEY GENERATION ALGORITHM NUMBER 962 |
| UNIQUE KEY GENERATOR A 963 |

KEY GENERATION RESPONSE 970
| REGISTRATION EXECUTION NUMBER 971 |
| UNIQUE KEY GENERATION/NON-GENERATION 972 |
| UNIQUE KEY GENERATOR B 973 |

UNIQUE ADDRESS NOTICE 980
| REGISTRATION EXECUTION NUMBER 981 |
| UNIQUE ADDRESS 982 |

REGISTRATION COMPLETION NOTICE 990
| REGISTRATION EXECUTION NUMBER 991 |
| REASON OF REGISTRATION COMPLETION 992 |

F I G. 1 1
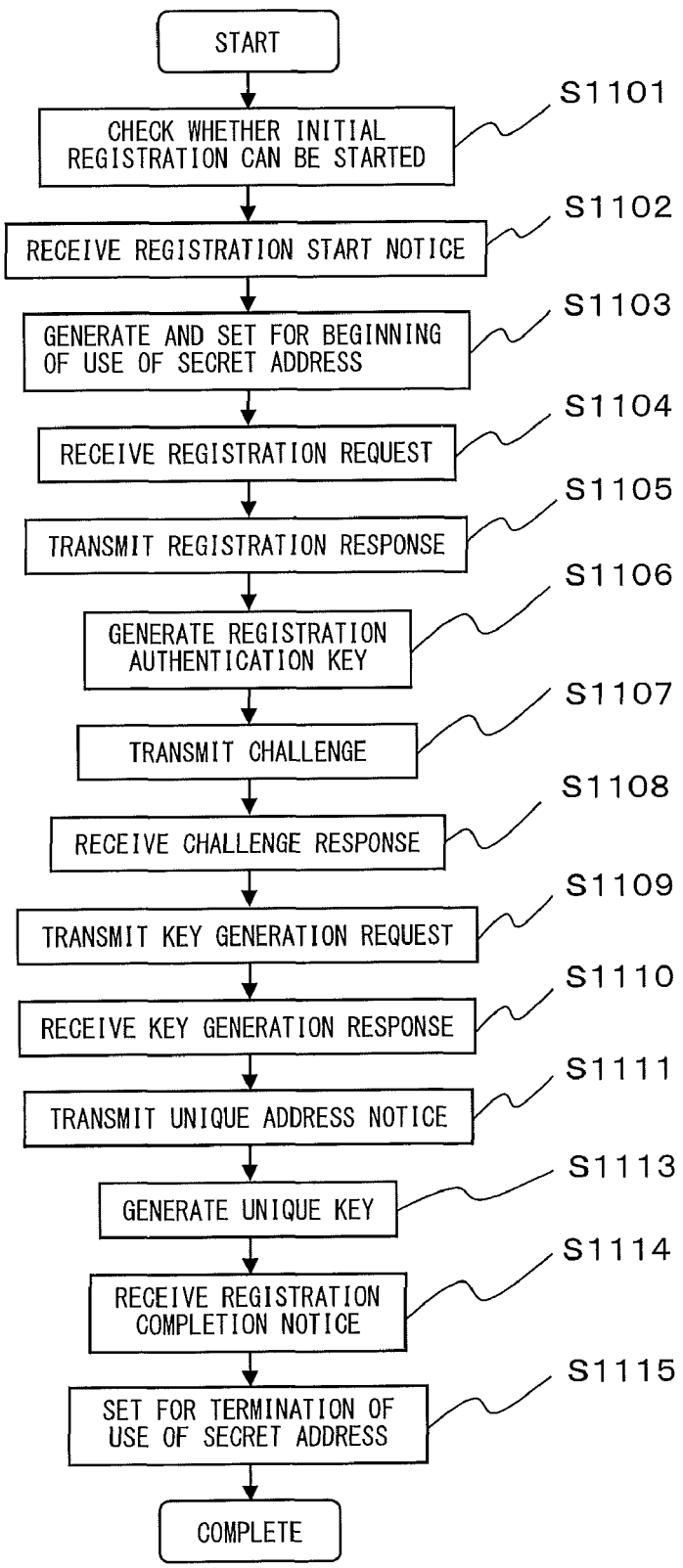

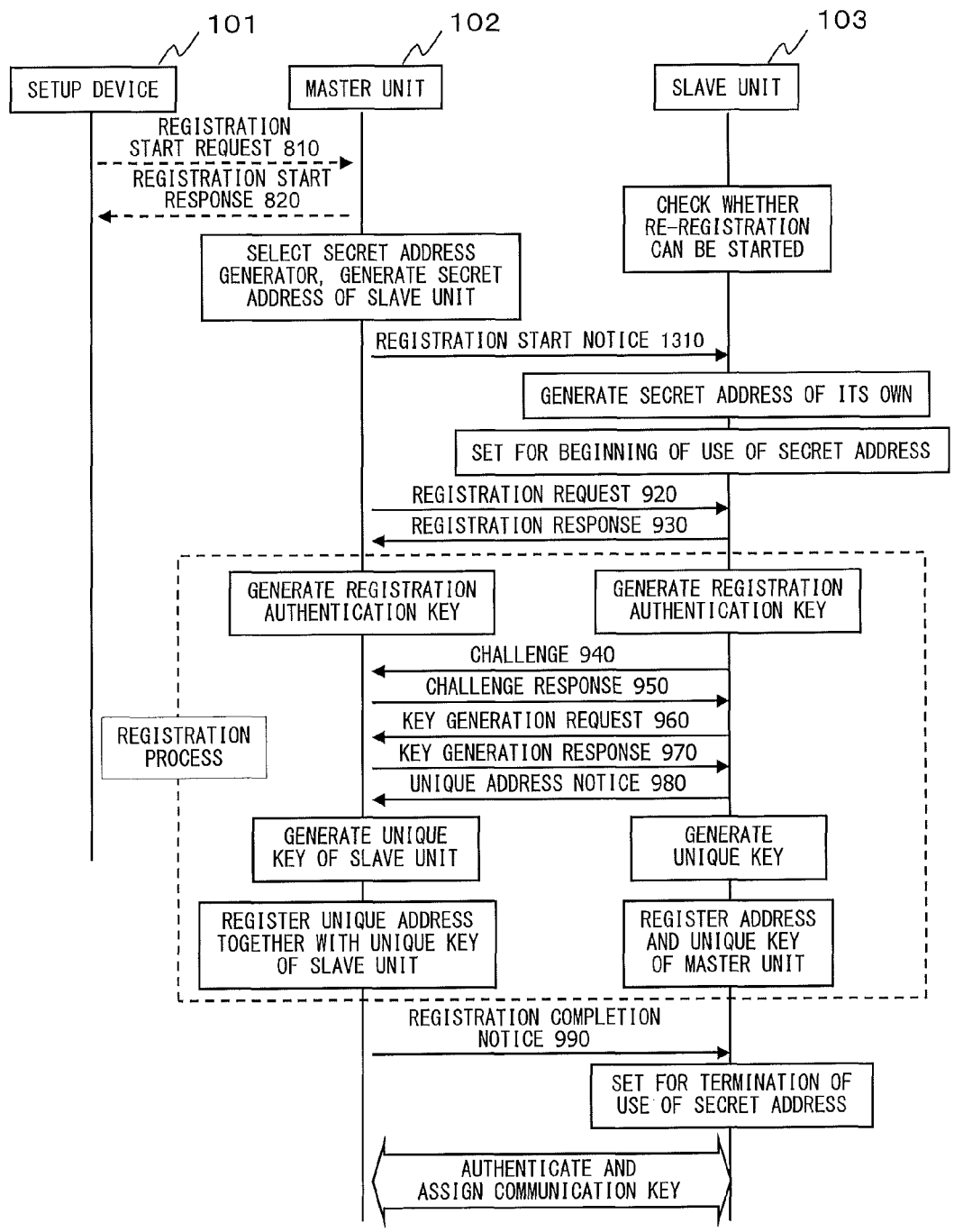

F I G. 1 8

REGISTRATION REQUEST 1810

| REGISTRATION EXECUTION NUMBER 1811 |
|---|
| REGISTRATION EXECUTION TYPE 1812 |
| REGISTRATION AUTHENTICATION KEY GENERATION ALGORITHM NUMBER 1813 |
| ENCRYPTION ALGORITHM NUMBER 1814 |
| REGISTRATION AUTHENTICATION KEY GENERATOR A 1815 |
| REGISTRATION CERTIFICATION INFORMATION 1816 |

US 8,402,272 B2

MASTER UNIT AND SLAVE UNIT

TECHNICAL FIELD

The present invention is directed to a technology which can facilitate registration of a plurality of communication devices (slave units) by a communication device (master unit) in a communication network.

BACKGROUND ART

In a communication network such as a wireless communication or a PLC (Power Line Communications), in order to prevent information leakage to the outside of the network, a commonly used method is to perform an authentication process for sharing an encryption key to be used in communication between a communication device which currently participates in the network and a communication device which tries to newly participate in the network, and once the authentication process is terminated, to conduct communication by encrypting data using the shared encryption key.

In one example of the authentication process, a user sets a common authentication key both in a slave unit which requests for authentication and a master unit which authenticates the slave unit, and the master unit, when it has confirmed that the slave unit has the same authentication key as that the master unit has, distributes an encryption key to the slave unit. However, unless the slave unit has a function to receive an input of an authentication key from outside, the authentication key that the slave unit retains cannot be changed from the one set at the time of manufacture of the slave unit. Accordingly, the security may not be secured.

In order to solve such a problem, there are, for example, technologies which are disclosed in Patent literatures 1 and 2. According to the technology disclosed in Patent literature 1, by pressing down both of buttons respectively provided in a master unit and a slave unit within a predetermined time period, an authentication is conducted only between the master unit and the slave unit whose buttons are pressed down within the predetermined time period. However, according to the technology disclosed in Patent literature 1, when a plurality of slave units are authenticated at one time, the user needs to repeat, with respect each of the slave units, an operation in which the user presses down buttons provided in the master unit and each of the slave unit within the predetermined time period and waits for an authentication to be terminated. A procedure like this imposes a heavy burden on the user, and thus needs to be reduced.

According to the technology disclosed in Patent literature 2, information specific to a client such as an ID and a password is preset in a server, and at the time of authentication, the client encrypts the information specific to the client by using a public key distributed by the server and transmits the encrypted information to the server. Then, when the information received by the server is identical with the preset information, the client is authenticated. However, the technology disclosed in Patent document 2 has a problem that, a Man in the Middle is present between a client and a server in a network and when the Man in the Middle manipulates a public key of the server, security cannot be secured. Further, when a public encryption key is used, a time required for encrypting and decrypting is longer than that required in a common key encryption method. Accordingly, when a plurality of slave units having low-end CPUs are to be authenticated, a time required for authenticating all the slave units becomes long.

CITATION LIST

Patent Literature

[PTL 1] Japanese Laid-Open Patent Publication No. 2003 377072 No. 2004-215232
[PTL 2] Japanese Laid-Open Patent Publication No. H07-325785

SUMMARY OF THE INVENTION

Problems to be Solved by the Invention

In order to provide a better convenience to a user by saving user's time and effort required for setup, and at the same time to shorten the time required for authenticating a slave unit, there is one possible method in which a MAC address of the slave unit is registered previously in a master unit. Upon receipt of an authentication request from the slave unit, the master unit approves the authentication request from the slave unit if the MAC address of the slave unit contained in the authentication request is identical with the one previously registered. However, a MAC address is information described as source address information of a normal packet transmitted by the slave unit, and thus any communication device at a position where the packet can be received can obtain the MAC address. Accordingly, there has been a problem that spoofing cannot be prevented and thus security cannot be secured.

Therefore, the present invention has been made in view of the above situation, and its object is to provide, when adding a plurality of slave units at one time to a network where a master unit controls a plurality of slave units, a slave unit registration process which provides better convenience to a user, shortens a time taken, and ensures security.

Solution to the Problems

The present invention is directed to a master unit which manages registration of a slave unit. In order to achieve the above objective, the master unit according to an embodiment of the present invention includes: a first communication section which receives an input of identification information of the slave unit; a secret address generation and setup section which: generates a secret address generator whose value varies every time the secret address generator is generated; and generates, based on the generated secret address generator and the identification information of the slave unit, a secret address of the slave unit to be used temporarily instead of a unique address of the slave unit; a second communication section which: transmits to and receives from the slave unit a notice relating to a registration process; transmits to the slave unit a registration start notice having stored therein the secret address generator by broadcast; and describes, when transmitting the notice relating to the registration process to the slave unit, a secret address of the slave unit and a unique address of the master unit as a destination address for the slave unit and a source address, respectively; a registration information storing section which stores registration information of the slave unit; a registration process section which: generates a registration authentication key to be used as an encryption key for encrypting communication with the slave unit; generates a unique key of the slave unit by transmitting to and receiving from the slave unit, unique key generation information encrypted using the generated registration authentication key; receives from the slave unit the unique address of the slave unit encrypted using one of the registration authentication key and the unique key of the slave unit; and stores the identification information of the slave unit, the unique address of the slave unit, and the unique key of the slave unit in association with one another in the registration information storing section.

Preferably, the registration process section may transmit, to the slave unit, registration authentication key generation information as a registration request; receive, from the slave unit, registration authentication key generation information as a registration response; and generate the registration authentication key based on the transmitted registration authentication key generation information, the received registration authentication key generation information, and the identification information of the slave unit.

The registration process section receives a plain text challenge from the slave unit; and confirms, by transmitting to the slave unit a cipher text challenge obtained by encrypting the received plain text challenge using the registration authentication key, that the common registration authentication key has been generated by the master unit and the slave unit.

The registration process section receives, from the slave unit, the unique key generation information encrypted using the registration authentication key as a key generation request; transmits, to the slave unit, the unique key generation information encrypted using the registration authentication key as a key generation response; and generates the unique key of the slave unit based on the received unique key generation information and the transmitted unique key generation information.

The registration process section decrypts, upon receipt from the slave unit of a unique address notice indicating an encrypted unique address of the slave unit, the encrypted unique address of the slave unit using the registration authentication key; and stores the identification information of the slave unit, the unique address of the slave unit, and the unique key of the slave unit in association with one another in the registration information storing section, thereby terminating the registration process of the slave unit.

The registration process section, upon termination of the registration process with respect to all of slave units connected with the master unit, transmits to each slave unit a registration termination notice indicating termination of use of the secret address by broadcast.

The registration process section determines whether the identification information of the slave unit, the unique address of the slave unit, and the unique key of the slave unit are present in the registration information storing section; and when a result of the determination is that the identification information of the slave unit, the unique address of the slave unit, and the unique key of the slave unit are present, updates only the unique key of the slave unit while retaining the identification information of the slave unit and the unique address of the slave unit.

The present invention is also directed to a slave unit connected with a master unit which manages registration. In order to achieve the above objective, the slave unit according to the present invention includes: a second communication section which: transmits to and receives from the master unit a notice relating to a registration process; receives, from the master unit, a registration start notice having stored therein a secret address generator whose value varies every time the secret address generator is generated; and describes, when transmitting the notice relating to the registration process to the master unit, a secret address of the slave unit generated based on the secret address generator and a unique address of the master unit as a source address for the slave unit and a destination address, respectively; a secret address generation and setup section which generates, based on the secret address generator received from the master unit and identification information of the slave unit, a secret address of the slave unit to be used temporarily instead of a unique address of the slave unit; a registration information storing section which stores information relating to the master unit; a registration process section which: generates a registration authentication key to be used as an encryption key for encrypting communication with the master unit; generates a unique key of the slave unit by transmitting to and receiving from the master unit unique key generation information encrypted using the generated registration authentication key; transmits, to the master unit, the unique address of the slave unit encrypted using one of the registration authentication key and the unique key of the slave unit; and stores the unique key of the slave unit and the unique address of the master unit in association with each other in the registration information storing section.

The registration process section receives, from the master unit, registration authentication key generation information as a registration request; transmits, to the master unit, registration authentication key generation information as a registration response; and generates the registration authentication key based on the received registration authentication key generation information, the transmitted registration authentication key generation information, and the identification information of the slave unit.

The registration process section transmits, to the master unit, a randomly generated plain text challenge; decrypts a cipher text challenge received from the master unit into a plain text challenge using the registration authentication key; and confirms, when the generated plain text challenge is identical with the plain text challenge into which the cipher text challenge has been decrypted, that the common registration authentication key has been generated by the master unit and the slave unit.

The registration process section transmits, to the slave unit, the unique key generation information encrypted using the registration authentication key as a key generation request; receives, from the master unit, the unique key generation information encrypted using the registration authentication key as a key generation response; and generates the unique key of the slave unit based on the transmitted unique key generation information and the received unique key generation information.

The registration process section encrypts, upon receipt from the master unit of the key generation response, the unique address of the slave unit using one of the registration authentication key and the unique key of the slave unit; and transmits, to the master unit, a unique address notice having stored therein the encrypted unique address of the slave unit.

The registration process section stores the unique key of the slave unit and the unique address of the master unit in association with each other in the registration information storing section.

The registration process section, upon receipt from the master unit of a registration termination notice indicating termination of use of the secret address, terminates use of the secret address.

The registration process section determines whether the unique address of the master unit and the unique key of the slave unit are stored in the registration information storing section; and determines, when a result of the determination is that the unique address of the master unit and the unique key of the slave unit are stored, that the master unit already retains the unique address of the slave unit, thereby not transmitting the unique address notice to the master unit.

Advantageous Effects of the Invention

According to the present embodiment, when slave units are newly added to a master unit, simply by inputting identification information of the respective slave units to the master unit, a registration process of the respective slave units can be performed so that the slave units are connected to the existing network. In addition, in an authentication process of the respective slave units to be performed after the registration process of the slave units, use of a common encryption key (unique key) allows authentication of the slave units to be terminated in a short time even when there are a large number of slave units to be registered.

BRIEF DESCRIPTION OF THE DRAWINGS

FIG. 6 is a sequence diagram showing an overall flow of a registration process.

FIG. 8 shows formats of external commands exchanged between a setup device 101 and the master unit 102.

FIG. 9 shows formats of messages exchanged between the master unit 102 and the slave unit 103.

FIG. 11 is a flow chart showing an initial registration process performed by respective slave units 103a to 103n.

FIG. 12 is a sequence diagram showing in detail a first re-registration process.

FIG. 13 shows a format of a registration start notice 1310.

FIG. 18 shows a format of a registration request 1810.

DESCRIPTION OF EMBODIMENTS

With reference to the drawings, the following will describe a network composed of communication devices (a master unit and slave units) according to embodiments of the present invention. In the present invention, first a unique key which is generated for each slave unit is shared between the master unit and the slave unit, and then a process is performed so that a communication key to be used in the network managed by the master unit is shared between the master unit and the slave unit. Hereinafter, a process performed to share a unique key between the master unit and the slave unit is called a registration process, and a process performed, after termination of the process to share the unique key, to share a communication key between the master unit and the slave unit is called an authentication process.

(1) System Configuration

Figure 1:
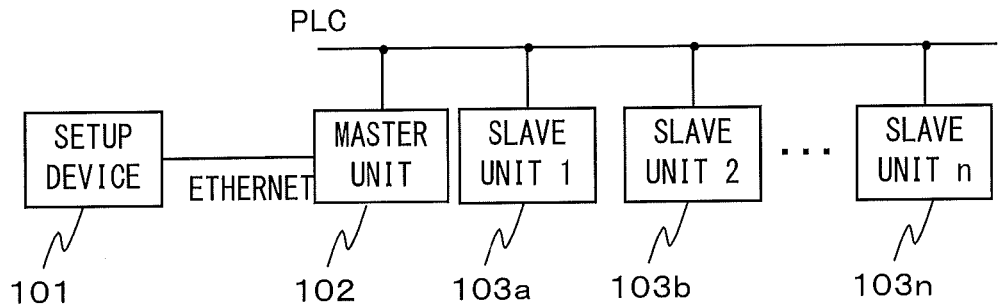
FIG. 1 shows a system configuration of a PLC network in the present invention.

FIG. 1 shows a system configuration of a PLC network according to the present invention. In FIG. 1, the PLC network according to the embodiments of the present invention is composed of a setup device 101 (for example, a PC or an IC card reader/writer), a master unit 102, and a plurality of slave units 103a to 103n.

The setup device 101 and the master unit 102 are connected with each other via an Ethernet (registered trademark) or a near field wireless communication, and exchange, through communication via the Ethernet (registered trademark) or the near field wireless communication, predefined external commands relating to the registration process. It is noted that communication security is secured while the setup device 101 and the master unit 102 exchange the external commands. Alternatively, the setup device 101 and the master unit 102 may be connected with each other by using a communication method other than the above, such as a USB (Universal Serial Bus) or the like.

The master unit 102 and each of the slave units 103a to 103n are connected with each other via a power line. Through communication via the power line, the master unit 102 and each of the slave units 103a to 103n exchange messages relating to the registration process and the authentication process and transmit data. Each of the master unit 102 and the slave units 103a to 103n has a fixed unique address. Each of the master unit 102 and the slave units 103a to 103n transmits a packet in which a unique address of one's own and that of a communication partner are described as a source address and a destination address, respectively, thereby determining between which terminals the packet is transmitted via communication. For example, a MAC address can be used as the unique address.

(2) Configuration of the Apparatus

Figure 2:
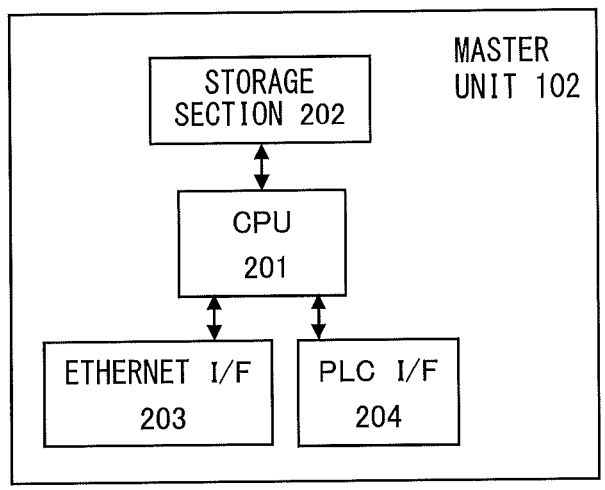
FIG. 2 is a block diagram showing a physical configuration of a master unit 102.

FIG. 2 is a block diagram showing a physical configuration of the master unit 102. In FIG. 2, the master unit 102 includes a CPU 201, a storage section 202, an Ethernet I/F 203, and a PLC I/F 204. Alternatively, the master unit 102 may include, instead of an Ethernet I/F, a near field wireless communication I/F. The master unit 102 causes the CPU 201 to execute a program stored in the storage section 202; conducts communication with the setup device 101 via the Ethernet I/F 203 connected with the Ethernet (registered trademark); and conducts communication with each of the slave units 103a to 103n via the PLC I/F 204 connected with the PLC network.

Figure 3:
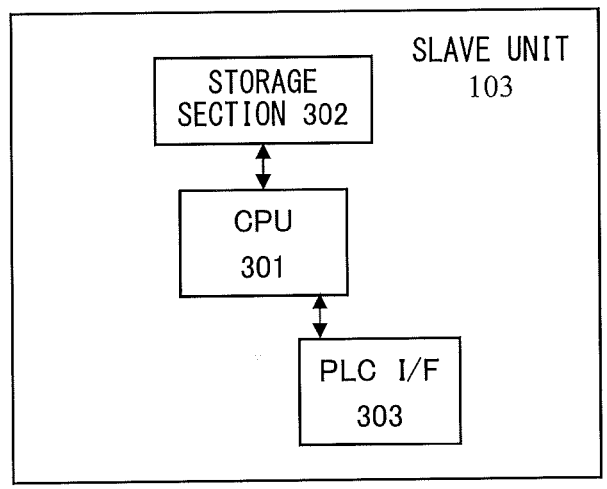
FIG. 3 is a block diagram showing a physical configuration of a slave unit 103.

FIG. 3 is a block diagram showing a physical configuration of the slave unit 103. In FIG. 3, the slave unit 103 includes a CPU 301, a storage section 302, and a PLC I/F 303. The slave unit 103 causes the CPU 301 to execute a program stored in the storage section 302; and conducts communication with the master unit 102 via the PLC I/F 303 connected with the PLC network. In an example shown in FIG. 3, the slave unit 103 does not include an Ethernet I/F; however, the slave unit 103 may include the Ethernet I/F in the same manner as the master unit 102. Hereinafter, the slave units 103a to 103n are collectively referred to as a slave unit 103.

First Embodiment

Figure 4:
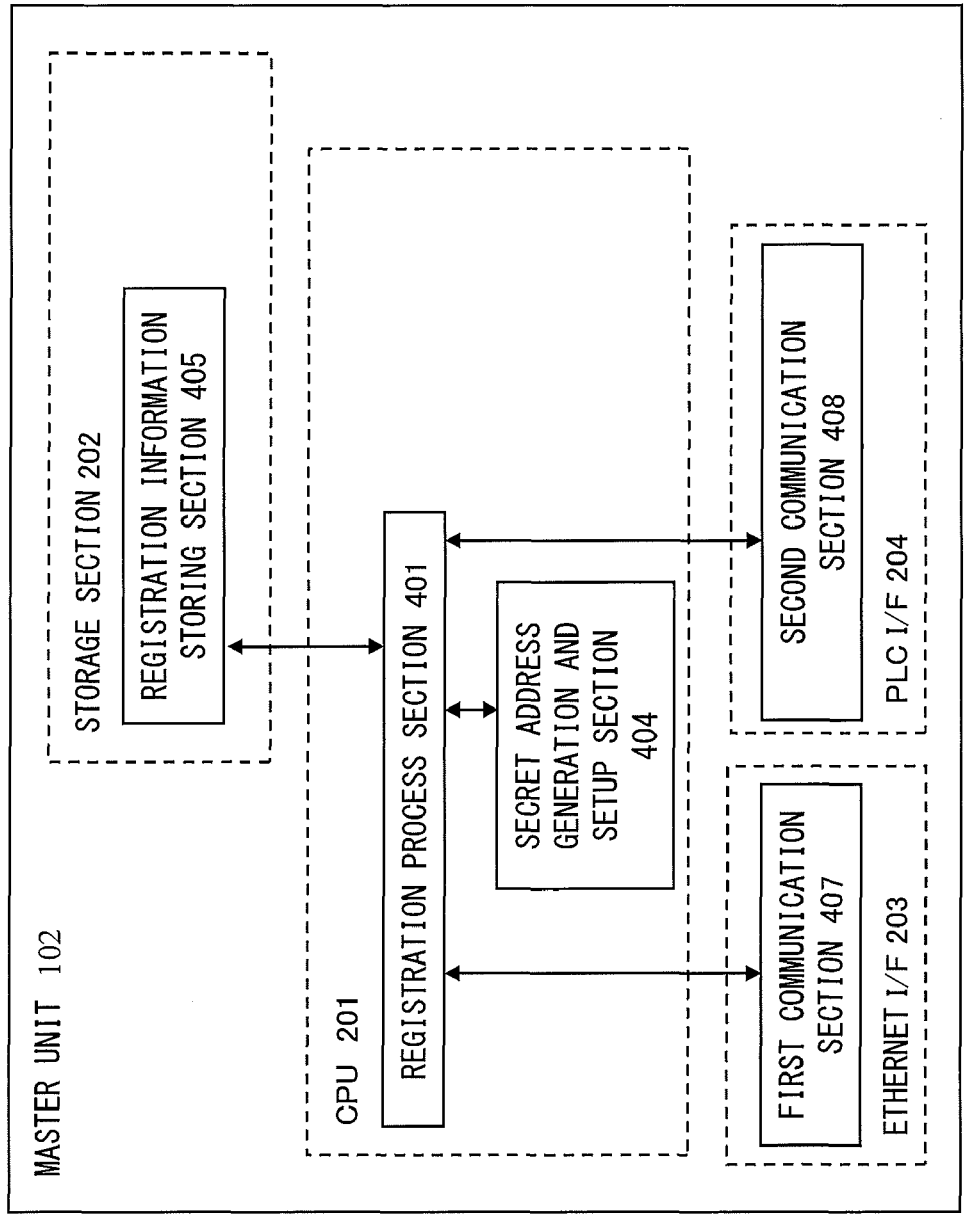
FIG. 4 is a block diagram showing a functional configuration of the master unit 102.

In a first embodiment, a registration process performed between a master unit 102 and each of slave units 103a to 103n will be described. FIG. 4 is a function block diagram showing functions of the master unit 102 in comparison with the physical configuration of the master unit 102 in FIG. 2. In FIG. 4, a CPU 201 has functions of a registration process section 401 and a secret address generation and setup section 404. A storage section 202 has a function of a registration information storing section 405. An Ethernet I/F 203 has a function of a first communication section 407. A PLC I/F 204 has a function of a second communication section 408. The registration information storing section 405 stores a unique address and a unique key of a slave unit 103 (that is, registration information of the slave unit 103) which has been registered.

The registration process section 401 performs a process in response to a command inputted via the first communication section 407, and, based on a result of the process, returns a response via the first communication section 407. The registration process section 401 generates a secret address of a slave unit 103 by means of the secret address generation and setup section 404. The generated secret address of the slave unit 103 is used as a destination address of a message transmitted to the slave unit 103 in the subsequent registration process. Upon termination of the registration process, the registration process section 401 stores a unique address and a unique key and the like of the slave unit 103 in the registration information storing section 405. Here, the secret address of the slave unit is an address temporarily used instead of the unique address of the slave unit. The secret address generation and setup section 404 generates a secret address of the slave unit 103 and notifies the registration process section 401 of the generated secret address.

Figure 5:
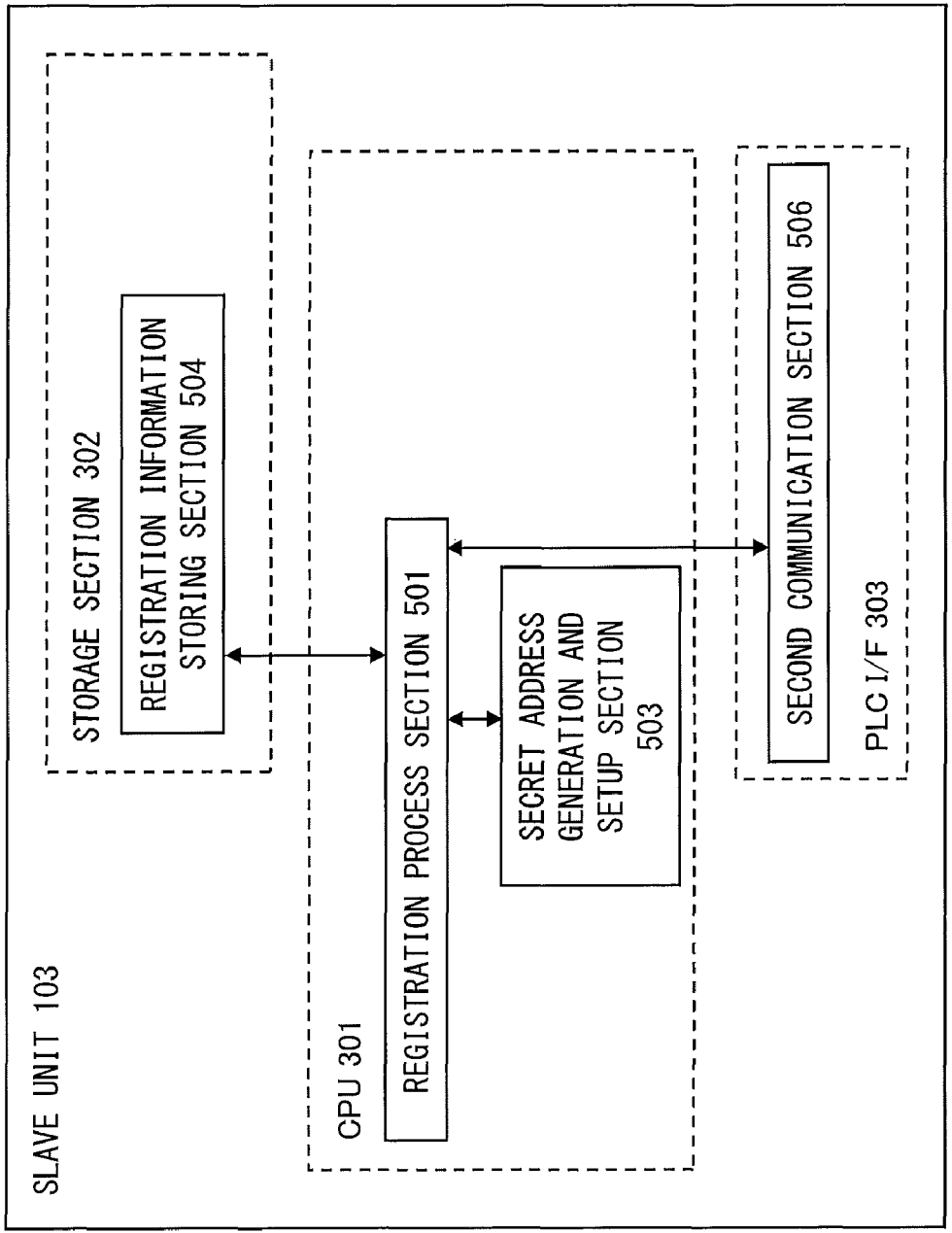
FIG. 5 is a block diagram showing a functional configuration of the slave unit 103.

FIG. 5 is a function block diagram showing functions which the slave unit 103 has in comparison with the physical configuration of the slave unit 103 in FIG. 3. In FIG. 5, a CPU 301 has functions of a registration process section 501 and a secret address generation and setup section 503. A storage section 302 has a function of a registration information storing section 504. A PLC I/F 303 has a function of a second communication section 506. The registration information storing section 504 stores a unique address and identification information (for example, BSSID) of the master unit 102, and a unique key and the like of the slave unit 103.

The registration process section 501 analyzes and processes messages (described later) relating to registration received from the master unit 102 via the second communication section 506. The secret address generation and setup section 503 generates a secret address of the slave unit 103 and notifies the registration process section 501 of the generated secret address. The registration process section 501 sets the secret address of the slave unit 103 generated by the secret address generation and setup section 503 in the second communication section 506. The slave unit 103 uses, instead of the unique address, the secret address of its own as a source/destination address in the registration process. Upon termination of the registration process, the registration process section 501 stores the unique address, the identification information (for example, BSSID) of the master unit 102, the unique key of the slave unit 103, and the like in the registration information storing section 504.

(3) Outline of the Registration Process

Next, the outline of the registration process will be described with reference to FIGS. 6, 8, and 9. FIG. 6 is a sequence diagram showing an overall flow of the registration process. FIG. 8 shows formats of external commands exchanged between a setup device 101 and the master unit 102. FIG. 9 shows formats of messages relating to the registration process which is exchanged between the master unit 102 and the slave unit 103.

With reference to FIG. 6, upon receipt from a user of a registration target slave unit list including identification information of the slave units 103a to 103n to be registered, the setup device 101 stores, in a registration start request 810, a slave unit information list based on the registration target slave unit list, and transmits the registration start request 810 to the master unit 102. The setup device 101 may receive the registration target slave unit list directly from the user, or from a scanning device, a near field wireless communication device, or the like. Here, the identification information of the slave unit is information specific to the slave unit other than a unique address. For example, the identification information of the slave unit is a serial number of the slave unit, a slave unit product number + a serial number, a PIN (Personal Identification Number), or the like.

The master unit 102 generates a registration start notice 910 based on a slave unit information list 814 contained in the registration start request 810, and transmits the registration start notice 910 to each of the slave units 103a to 103n by broadcast. Then, the master unit 102 transmits a registration request 920 sequentially to each of the slave units 103a to 103n which are contained in the slave unit information list 814. Then the master unit 102 performs the registration process with respect to each of the slave units 103, and obtains a unique address of each of the slave units and share a unique key with each of the slave units. Upon termination of the registration process with respect to all of the slave units contained in the slave unit information list 814, the master unit 102 transmits a registration termination notice 990 to each of the slave units 103a to 103n.

Upon receipt of a registration result acquisition request from the setup device 101, the master unit 102 transfer a registered slave unit list containing unique addresses and unique keys of the respective slave units and the like to the setup device 101. The setup device 101 stores, in an external storage device, the registered slave unit list having been received from the master unit 102, and uses the registered slave unit list at the time of re-registration. During the registration process, in response to each registration progress check request from the setup device 101, the master unit 102 transmits a current state of progress of the registration process to the setup device 101.

(4) Initial Registration Method

Figure 7:
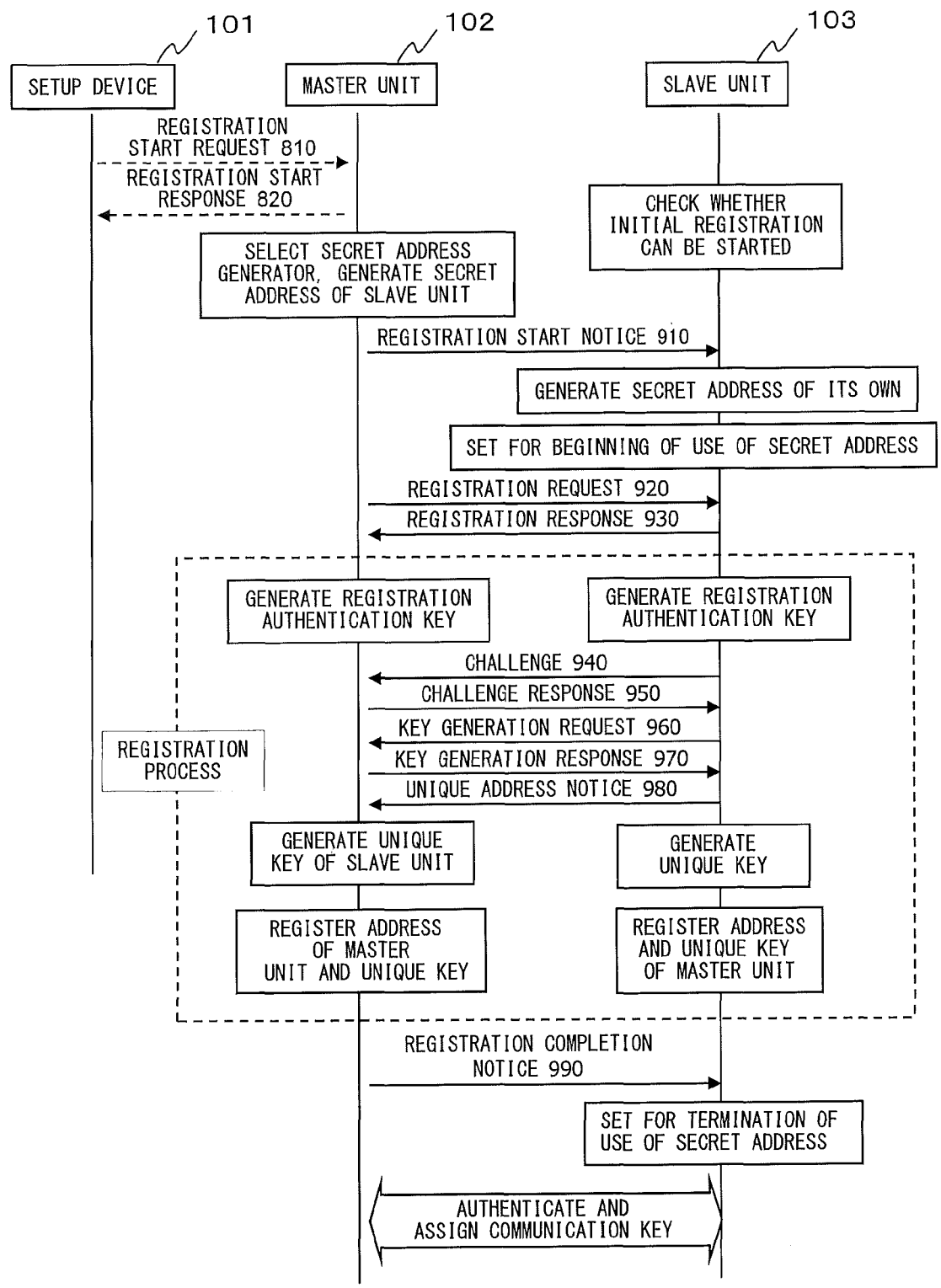
FIG. 7 a sequence diagram showing in detail an initial registration process.
Figure 10:
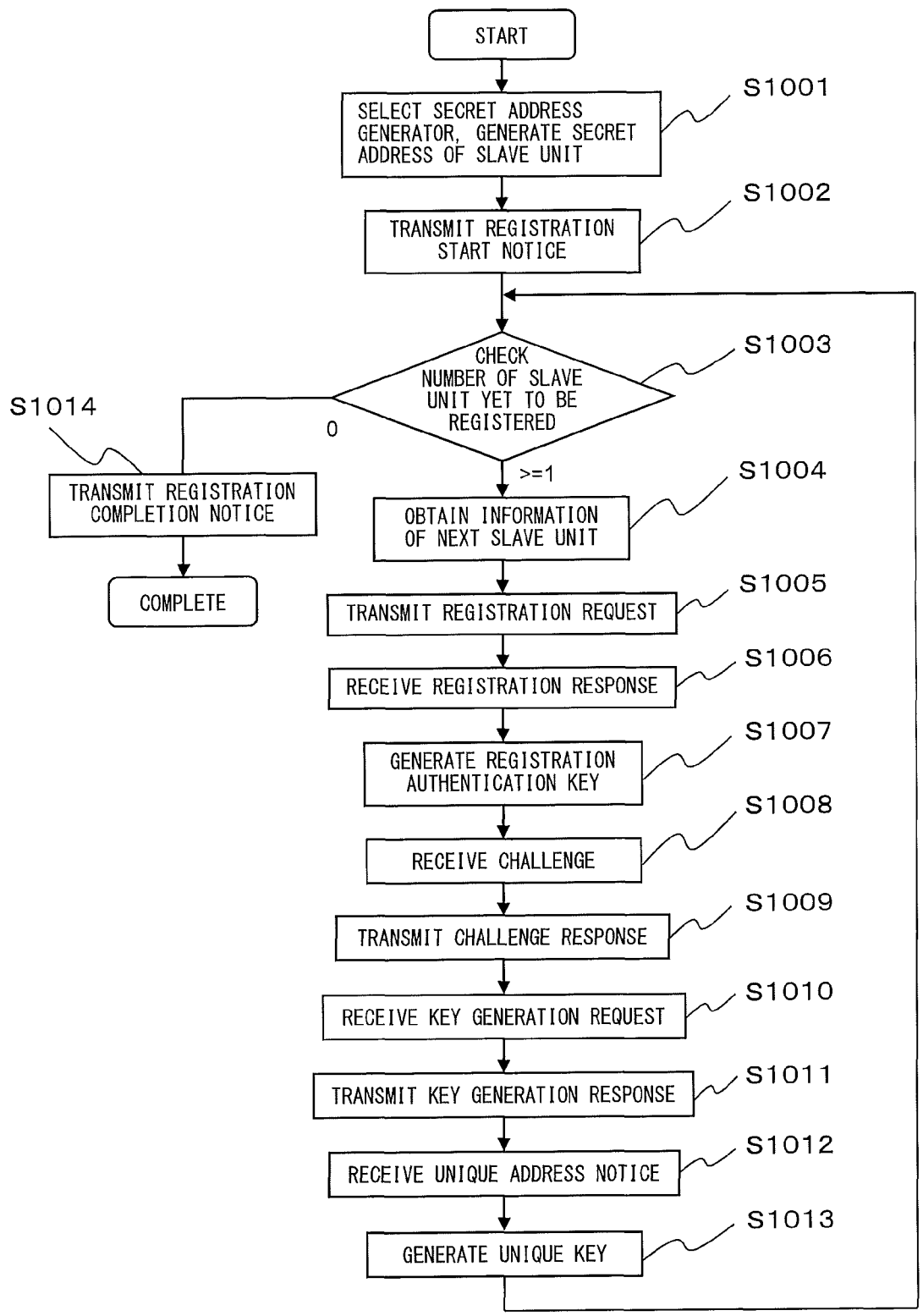
FIG. 10 is a flow chart showing an initial registration process performed by the master unit 102.

FIG. 7 is a sequence diagram showing in detail an initial registration process. Here, the initial registration process is a registration process performed with respect to the slave unit 103 yet to be registered (that is, the slave unit 103 whose information is not stored in the registration information storing section 504). FIG. 10 is a flow chart showing an initial registration process performed by the master unit 102. FIG.

11 is a flow chart showing an initial registration process performed by each of the slave units 103a to 103n.

In the following, a method of initial registration will be described with reference to FIGS. 7, 10, and 11.

As shown in FIG. 7, upon receipt of a registration start request 810 from the setup device 101, the master unit 102 determines such as whether the registration process is in process; whether a number of slave units which can be registered is reached; whether a slave unit 103 contained in the slave unit information list 814 has been already registered; whether there is any error in the identification information of the slave unit 103, or the like. Then the master unit stores a result of the determination in a registration start response 820 and transmits the registration start response 820 to the setup device 101. When the initial registration specified in a registration execution type is executable and there is no error in the slave unit information list, the master unit 102 starts the following initial registration process.

In step S1001 (see FIG. 10), the master unit 102 selects a secret address generator and generates a secret address of the slave unit based on the identification information of the slave unit contained in the slave unit information list 814 in the registration start request 810 (The method will be described later. The same shall apply hereinafter).

In step S1101 (see FIG. 11), after determining that the registration process with the master unit 102 has not been terminated and the registration process with another master unit is not in process, each of the slave units 103a to 103n waits for the registration start notice 910 from the master unit.

In step S1002 (see FIG. 10), the master unit 102 transmits to each the slave units 103a to 103n the registration start notice 910 (see FIG. 9) having stored therein a secret address generator 913 and the like by broadcast. These pieces of information stored in the registration start notice 910 may be collectively referred to as secret address generation information.

In step S1102 (see FIG. 11), each of the slave units 103a to 103n receives the registration start notice 910 from the master unit 102. Next, in step S1103 (see FIG. 11), each of the slave units 103a to 103n reads the secret address generator 913 from the received registration start notice 910, and generates a secret address of its own based on the read secret address generator 913 and the identification information of its own. Then, each of the slave units 103a to 103n performs setting for beginning of use of the generated secret address.

In step S1003 (see FIG. 10), the master unit 102 checks, among the slave units contained in the slave unit information list 814, the number of slave units yet to be registered. When the number of the slave units yet to be registered is 0, the master unit 102 proceeds the processing to step S1014. When the number of the slave units yet to be registered is one or more, the master unit 102 proceeds the processing to step S1004.

In step S1004 (see FIG. 10), the master unit 102 obtains, from the slave unit information list 814, information of a slave unit with respect to which the master unit 102 performs the registration process next. Here, it is assumed that information of the slave unit 103a among the slave units 103a to 103n is obtained. In step S1005 (see FIG. 10), the master unit 102 transmits a registration request 920 (see FIG. 9) after describing therein, as a destination address, a secret address of the slave unit 103a contained in the information having been obtained in step S1004; the registration request 920 having stored therein a registration authentication key generation algorithm No. 922 representing an algorithm used for generating a registration authentication key; a encryption algorithm No. 923 representing an algorithm used for encrypting messages exchanged in the registration process; and a registration authentication key generator A924 which is information used for generating a registration authentication key.

Here, the registration authentication key is used as an encryption key which encrypts communication between the master unit 102 and the slave unit 103. In the registration authentication key generation algorithm No. 922, for example, a number representing a type of registration authentication key generation algorithm previously shared between the master unit 102 and the slave unit 103 is set. In the encryption algorithm No. 923, for example, a number representing a type of encryption algorithm previously shared between the master unit 102 and the slave unit 103, is set. In the registration authentication key generator A924, an optional number (may be a random number) is set. These information stored in the registration request 920 may be collectively referred to as registration authentication key generation information.

In step S1104 (see FIG. 11), the slave unit 103a receives the registration request 920 in which the secret address of its own is described as the destination address. Next in step S1105, the slave unit 103a checks a content of each field of the received registration request 920 (see FIG. 9). When there is no error found, the slave unit 103a stores a registration authentication key generator B933 in a registration response 930 (see FIG. 9), and transmits the registration response 930 to the master unit 102. Here, in the registration authentication key generator B933, an optional number (may be a random number) is set. These information stored in the registration response 930 may be collectively referred to as registration authentication key generation information.

In step S1006 (see FIG. 10), the master unit 102 receives the registration response 930 (see FIG. 9) transmitted by the slave unit 103a, and proceeds the processing to step S1007. In step S1006, the master unit 102 checks a content of each field of the registration response 930. When there is any error found, the master unit 102 stops the registration process with respect to the slave unit 103a and returns the processing to step S1003. Then, the master unit 102 may obtain, from the slave unit information list 814, information of a slave unit with respect to which the master unit 102 performs the registration process next; and transmit a registration request 920 to the slave unit. In step S1007 (see FIG. 10), the master unit 102 generates, from the registration authentication key generator A924 and the registration authentication key generator B933, a registration authentication key by using a registration authentication key generation algorithm which is specified by the registration authentication key generation algorithm No. 922.

In step S1106 (see FIG. 11), the slave unit 103a generates, from the registration authentication key generator A924 and the registration authentication key generator B933, a registration authentication key by using the registration authentication key generation algorithm which is specified by the registration authentication key generation algorithm No. 922. In step S1107 (see FIG. 11), the slave unit 103a transmits, to the master unit 102, a challenge 940 (see FIG. 9) having stored therein a plain text challenge 942 which is text data randomly generated, the text challenge 942 used for determining whether the common registration authentication key has been generated by the master unit 102 and the slave unit 103a.

In step S1008 (see FIG. 10), the master unit 102 receives the challenge 940 transmitted by the slave unit 103a, and encrypts the plain text challenge 942 in the received challenge 940 by using the registration authentication key and the encryption algorithm specified by the encryption algorithm No. 923. Next in step S1009 (see FIG. 10), the master unit 102 transmits, to the slave unit 103a, a challenge response 950 (see FIG. 9) having stored therein an cipher text challenge 952.

In step S1108 (see FIG. 11), the slave unit 103a receives the challenge response 950 transmitted by the master unit 102. The slave unit 103a decrypts, based on the encryption algorithm specified by the encryption algorithm No. 923, the cipher text challenge 952 stored in the received challenge response 950 by using the registration authentication key. Then, the slave unit 103a compares the decrypted cipher text challenge 952 with the plain text challenge 942 which the slave unit 103a transmitted to the master unit 102 and determines whether the decrypted cipher text challenge 952 is identical with the plain text challenge 942.

After confirming a result of the comparison, the slave unit 103a proceeds the processing to step S1109, and transmits, to the master unit 102, a key generation request 960 (see FIG. 9) having stored therein a unique key generation algorithm No. 962 and a unique key generator A963. In the unique key generation algorithm No. 962, for example, a number representing a type of unique key generation algorithm previously shared between the master unit 102 and the slave unit 103 is set. In the unique key generator A963, an optional number (may be a random number) is set. These information stored in the key generation request 960 may be collectively referred to as unique key generation information. In step S1108, when the result of the comparison shows that the decrypted cipher text challenge 952 is not identical with the plain text challenge 942, the slave unit 103a may stop the registration process and proceeds the processing to step S1115.

In step S1010 (see FIG. 10), the master unit 102 receives the key generation request 960 from the slave unit 103a, and proceeds the processing to step S1011. In step S1010, the master unit 102 checks a content of each field of the received key generation request 960. When there is any error found, the master unit 102 may stop the registration process with respect to the slave unit 103a, and return the processing to step S1003. Then, the master unit 102 may obtain, from the slave unit information list 814, information of a slave unit with respect to which the master unit 102 performs the registration process next and transmit a registration request 920 to the slave unit. In step S1011, the master unit 102 transmits a key generation response 970 (see FIG. 9) having stored therein a unique key generator B973 and the like to the slave unit 103. In the unique key generator B973, an optional number (may be a random number) is set. The key generation response 970 may further contain a unique key generation/non-generation flag 972 which indicates whether a unique key has been generated or not. These information stored in the key generation response 970 may be collectively referred to as key generation information.

In step S1110 (see FIG. 11), the slave unit 103a receives the key generation response 970. Next in step S1111 (see FIG. 11), the slave unit 130a encrypts the unique address of its own using the registration authentication key, and transmits a unique address notice 980 (see FIG. 9) having stored therein an encrypted unique address 982 which is the encrypted unique address of its own to the master unit 102.

In step S1012 (see FIG. 10), the master unit 102 receives the unique address notice 980 transmitted by the slave unit 103a, and decrypts, using the registration authentication key, the unique address of the slave unit 103a stored in the received unique address notice 980. In step S1012, when the unique address notice 980 has not been properly received, the master unit 102 may stop the registration process with respect to the slave unit 103a, and return the processing to step S1003. Then, the master unit 102 may obtain, from the slave unit information list 814, information of a slave unit with respect to which the master unit 102 performs the registration process next, and transmit a registration request 920 to the slave unit.

In step S1013 (see FIG. 10), the master unit 102 generates, based on the unique key generator A963 and the unique key generator B973, a unique key of the slave unit based on the specified unique key generation algorithm; and stores the generated unique key in association with the unique address or with the identification information of the slave unit 103 in the registration information storing section 405. When a plurality of slave units are set in the slave unit information list 814, the master unit 102 repeats, with respect to each of the plurality of slave units, the registration process starting from step S1003 through to step S1013. Next in step S1014 (see FIG. 10), upon termination of the registration process with respect to the plurality of slave units, the master unit 102 transmits to each of the slave units 103a to 103n a registration termination notice 990 (see FIG. 9) by broadcast, thereby terminating the initial registration process.

In step S1113 (see FIG. 11), the slave unit 103 generates, based on the unique key generator A963 and the unique key generator B973, the unique key of the slave unit 103 by using the specified unique key generation algorithm; and stores the generated unique key and the unique address of the master unit 102 in association with each other in the registration information storing section 504. The slave unit 103a may perform the unique address notice transmission process in step S1111 after performing the unique key generation process in step S1113; encrypt the unique address of its own using the unique key; and transmit the unique address notice 980 (see FIG. 9) having stored therein the encrypted unique address 982 to master unit 102.

In step S1114 (see FIG. 11), the slave unit 103 receives the registration termination notice 990 from the master unit 102. In step S1115 (see FIG. 11), upon receipt of the registration termination notice 990 from the master unit 102, the slave unit 103a performs setting for termination of use of the secret address, thereby terminating the initial registration process. An example of the initial registration process performed between the master unit 102 and each of the slave units 103a to 103n has been described above.

It is noted that the master unit 102 may store in the registration information storing section 405 all the unique keys and the unique addresses, or the identification information of all of the respective slave units 103a to 103n after termination of the registration process with respect to all the slave units 103a to 103n.

In step S1115 (see FIG. 11), the slave unit 103a performs setting for termination of use of the generated secret address upon receipt of the registration termination notice 990 from the master unit 102. Alternatively, the slave unit 103a may perform setting for termination of use of the generated secret address upon termination of the registration process between the master unit 102 and the slave unit 103a. Still alternatively, the slave unit 103a may perform setting for termination of use of the generated secret address upon occurrence of a timeout after a predetermined time period after receipt of the registration start notice. Yet alternatively, these determination methods may be used in combination. For example, the slave unit 103a may perform setting for termination of use of the generated secret address either upon receipt of the registration termination notice 990 from the master unit 102 or upon occurrence of the timeout after the predetermined time period after receipt of the registration start notice, whichever is earlier.

The registration authentication key generation algorithm specified by the registration authentication key generation algorithm No. 922 in the registration request 920 and the unique key generation algorithm specified by the unique key generation algorithm No. 962 in the key generation request 960, may be either a key generation algorithm which is open to the public or a key generation algorithm which is not open to the public. An example of the key generation algorithm which is open to the public is the Diffie-Hellman algorithm. Alternatively, the slave units may be grouped into categories based on serial numbers or information contained in the product numbers of the respective slave units, and a different key generation algorithm may be used or an encryption key having a different key length may be generated based on the categories.

(5) First Re-registration Process

In the following, a first re-registration process which is performed after termination of the initial registration process between the slave unit 103 and the master unit 102, will be described. FIG. 12 is a sequence diagram showing in detail the first re-registration process. Here, the first re-registration process is a registration process which is performed between the master unit 102 and a slave unit having been registered (that is, a slave unit whose registration information is stored in the registration information storing section 504). The first re-registration process is performed, for example, when the master unit 102 is replaced due to or recovered from malfunction (registration information is corrupted). Hereinafter, the master unit before being exchanged or occurrence of malfunction is referred to as a former master unit.

As shown in FIG. 12, upon receipt of a registration start request 810 from the setup device 101, the master unit 102 determines whether the registration process is in process; whether a number of slave units which can be registered is reached; whether a slave unit contained in the slave unit information list 814 has been already registered; or whether there is any error in the identification information of the slave unit. Then the master unit 102 stores a result of the determination in the registration start response 820 and transmits the result of the determination to the setup device 101. Unlike the initial registration process, the registration start request 810 in the first re-registration process contains, as the slave unit information list 814, not only the identification information of the slave unit but also a unique address and a unique key of the slave unit. When the re-registration specified in a registration execution type 811 is executable and there is no error in the slave unit information list 814, the master unit 102 starts the first re-registration process.

Figure 14:
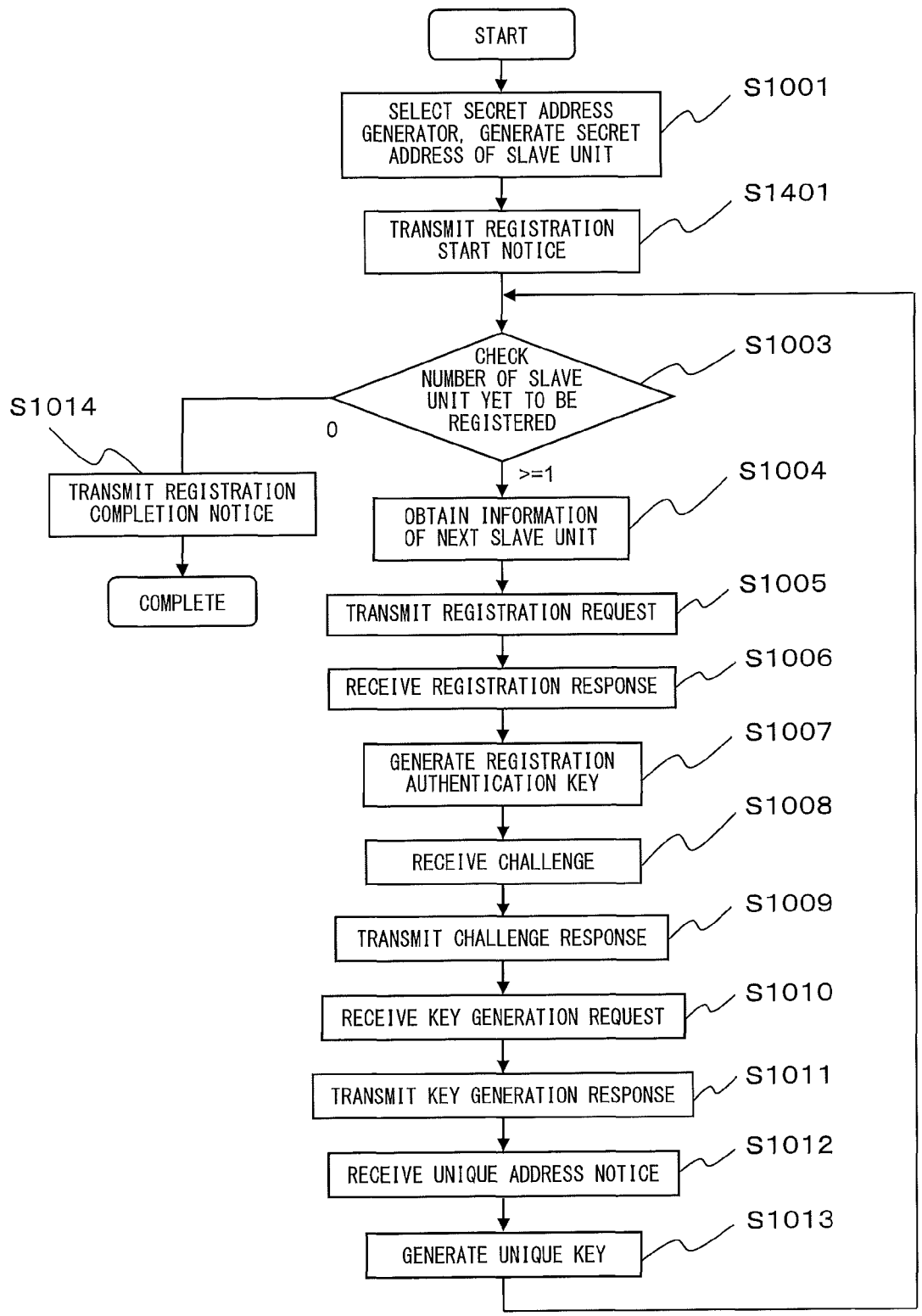
FIG. 14 is a flow chart showing a first re-registration process performed by the master unit 102.
Figure 15:
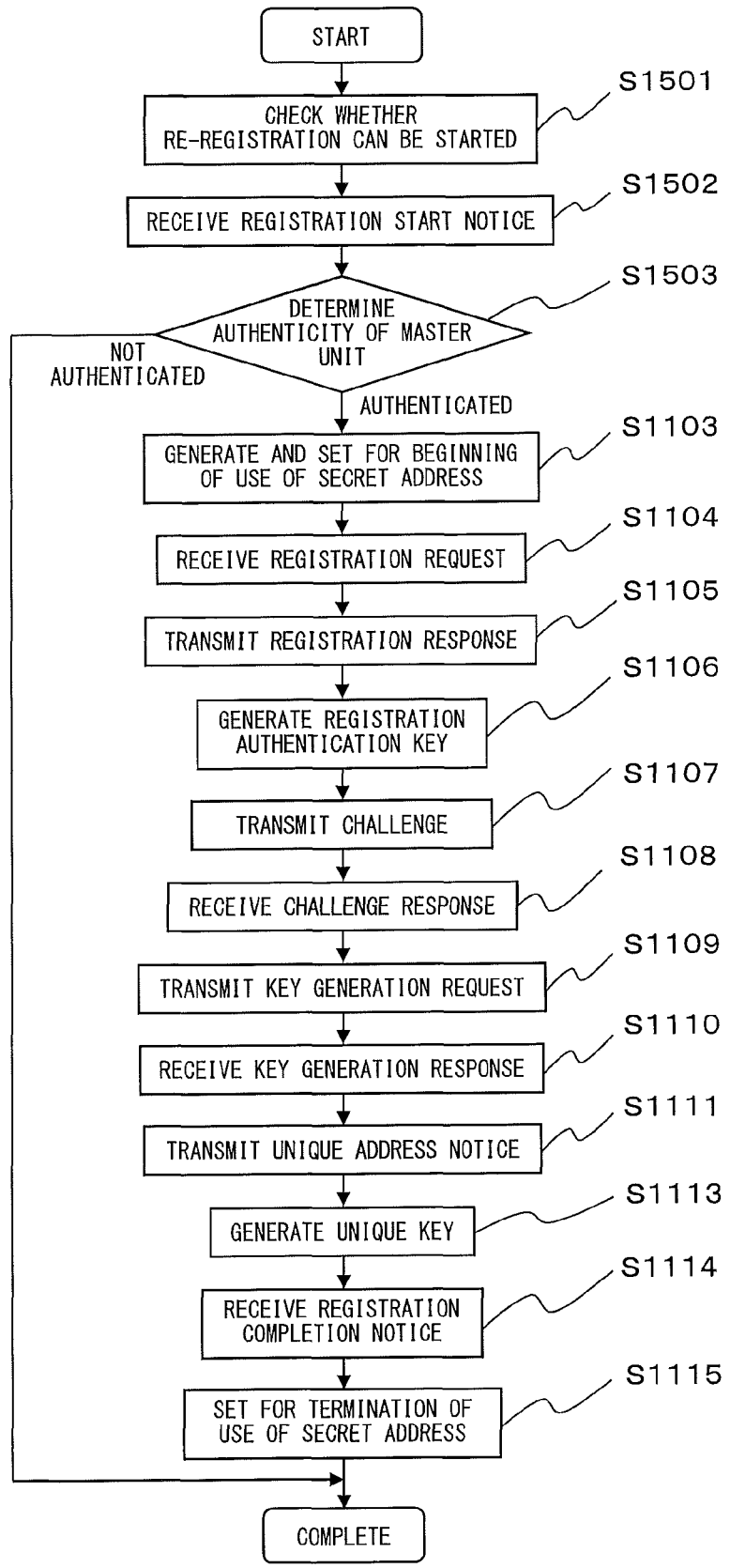
FIG. 15 is a flow chart showing a first re-registration process performed by each of the slave units 103a to 103n.

FIG. 14 is a flow chart showing a first re-registration process performed by the master unit 102. FIG. 15 is a flow chart showing a first re-registration process performed by each of the slave units 103*a* to 103*n*. In FIG. 14, among steps performed in the first re-registration process, steps which are the same as those performed in the initial registration process, are denoted by the same reference numerals as those in FIG. 10. The first re-registration process in FIG. 14 is different from the initial registration process in that step S1401 is performed instead of S1002.

In FIG. 15, among steps performed in the first re-registration process, steps which are the same as those performed in the initial registration process, are denoted by the same reference numerals as those in FIG. 10. The first re-registration process in FIG. 15 is different from the initial registration process in that step S1501 and step S1502 are performed instead of step S1101 and step S1102, respectively, and step S1503 is performed subsequently to step S1502.

FIG. 13 shows a format of a registration start notice 1310 among messages exchanged between the master unit 102 and the slave unit 103 in the first re-registration process. Formats of other messages are not shown because these formats are the same as those of the messages exchanged in the initial registration.

In the following, among the steps performed in the first re-registration process steps, only steps different from those performed in the initial registration process will be described, and descriptions of other steps are omitted. In step S1401 (see FIG. 14), the master unit 102 transmits to each of the slave units 103*a* to 103*n* a registration start notice 1310 (see FIG. 13) having stored therein a secret address generator 1313, a unique address 1314 of the former master unit, and a registration certification information 1315 by broadcast. Here, the registration certification information 1315 is used to authenticate the master unit 102. It is noted that, in the present embodiment, as the registration certification information 1315, a calculation is performed with respect to each of fields of the registration start notice 1310 shown above the registration certification information 1315 by using a one-way function (for example, Hash function). Then, a result of the calculation is encrypted using a unique key of each slave unit, and the same number of results of the encryption as the number of the slave units 103*a* to 103*n* are stored.

In step S1501 (see FIG. 15), after confirming that the registration process with respect to its own has been terminated and that it is detected that the master unit 102 has been replaced due to or recovered from malfunction, each of the slave units 103*a* to 103*n* waits for a registration start notice 1310 from the master unit 102. In step S1502 (see FIG. 15), each of the slave units 103*a* to 103*n* receives the registration start notice 1310 from the master unit 102.

Next in step S1503 (see FIG. 15), as the same manner as the master unit 102, the slave unit 103 performs a calculation with respect to each of fields of the received registration start notice 1310 by using a one-way function, generates registration certification information using the unique key of its own, and determines whether the same information as the generated registration certification information is contained in the registration start notice 1310. When the same information as the generated registration certification information is not contained in the registration start notice 1310, the slave unit 103 determines that the master unit 102 is not authenticated, and ignores the received registration start notice 1310, thereby terminating the re-registration process.

In step S1503 (see FIG. 15), on the other hand, when the same information as the generated registration certification information is contained in the registration start notice 1310, the slave unit 103 determines that the master unit 102 is authenticated and proceeds the processing to step S1103. Then, the slave unit 103 generates a secret address of its own based on the secret address generator 1313 contained in the registration start notice 1310, and performs setting for beginning of use of the generated secret address. Other steps are the same as those performed in the initial registration process, and thus descriptions thereof are omitted.

When the identification information, the unique address, and the unique key of the slave unit 103 are present in the registration information storing section 405, the master unit 102 may update only the unique key of the slave unit 103 while retaining the identification information and the unique address of the slave unit 103. When the unique address of the slave unit is contained in the slave unit information list inputted from the setup device 101 to the master unit 102 (or when the unique address of the master unit 102 and the unique key of the slave units are stored in the registration information storing section 504), because the master unit 102 already retains the unique address of the slave unit, the slave unit 103 may not necessarily need to perform the process of step S1111. According to the present embodiment, the re-registration process required due to, for example, replacement of the master unit 102 can be performed in a simple manner.

(6) Second Re-registration Process

Figures 16, 17:
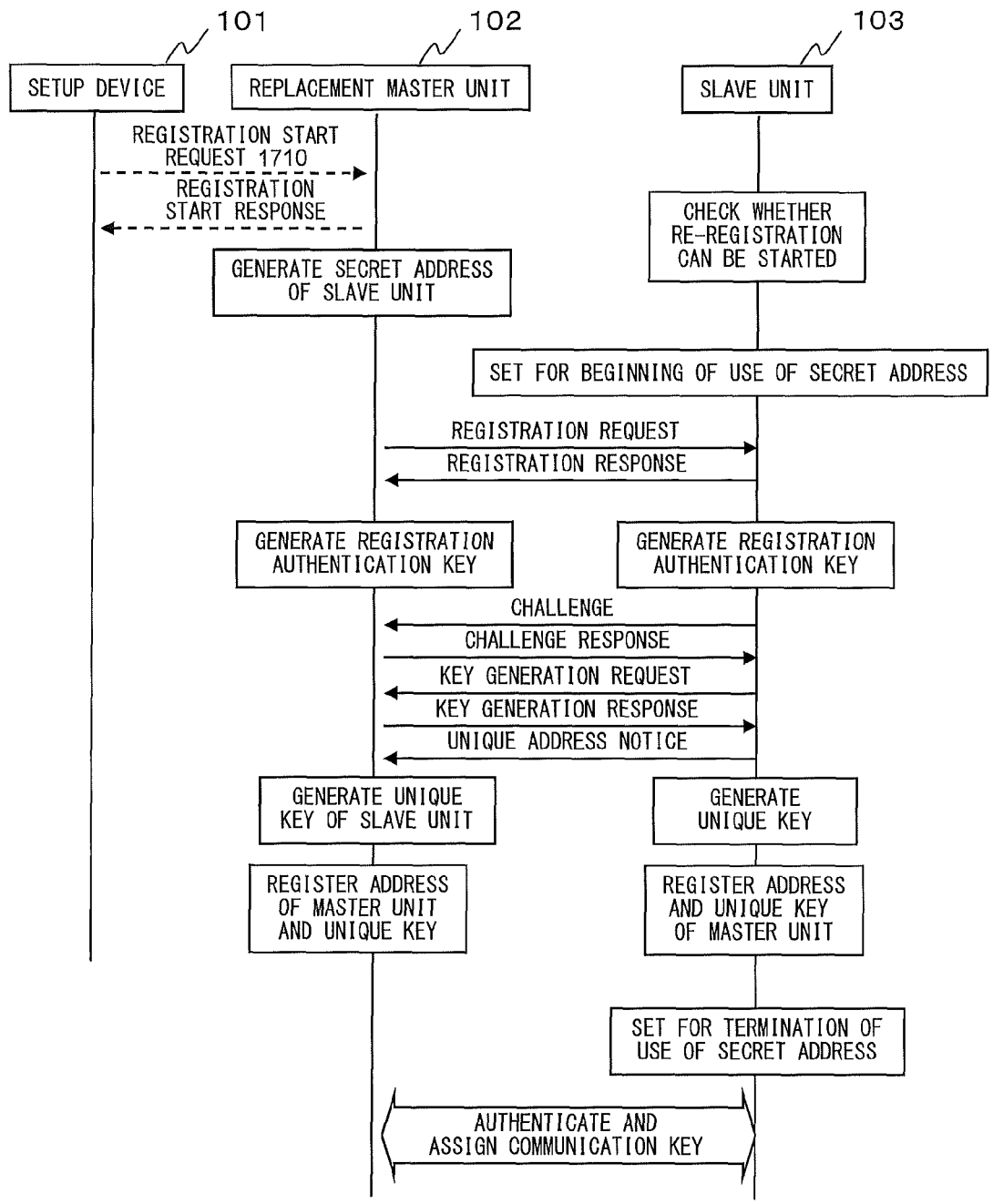
FIG. 16 is a sequence diagram showing in detail a second re-registration process.
FIG. 17 shows a format of a registration start request 1710.

Instead of the first re-registration process, a second re-registration process described below may be performed. FIG. 16 is a sequence diagram showing in detail the second re-registration process. FIG. 17 shows a format of a registration start request 1710 among external commands exchanged between the setup device 101 and the master unit 102 in the second re-registration process. Formats of other messages are the same as those of the external commands exchanged in the first re-registration process, and thus descriptions thereof are omitted.

Upon receipt of the registration start request 1710 from the setup device 101, the master unit 102 determines whether the registration process is in process; whether a number of slave units which can be registered is reached; whether a slave unit contained in the slave unit information list 1715 has been already registered; or whether there is any error in the identification information of the slave unit. Then the master unit 102 stores a result of the determination in a registration start response 820 and transmits the result of the determination to the setup device 101. However, in the second re-registration process, the registration start request 1710 (see FIG. 17) contains the secret address generator 1713 which has been used in the prior registration. The slave unit information list 1715 contains not only the identification information of the slave unit but also the unique address and the unique key of the slave unit. When the re-registration specified as an execution type in the registration execution type 1711 is executable, and there is no error in the slave unit information list 1715, the master unit 102 starts the second re-registration process.

Figure 19:
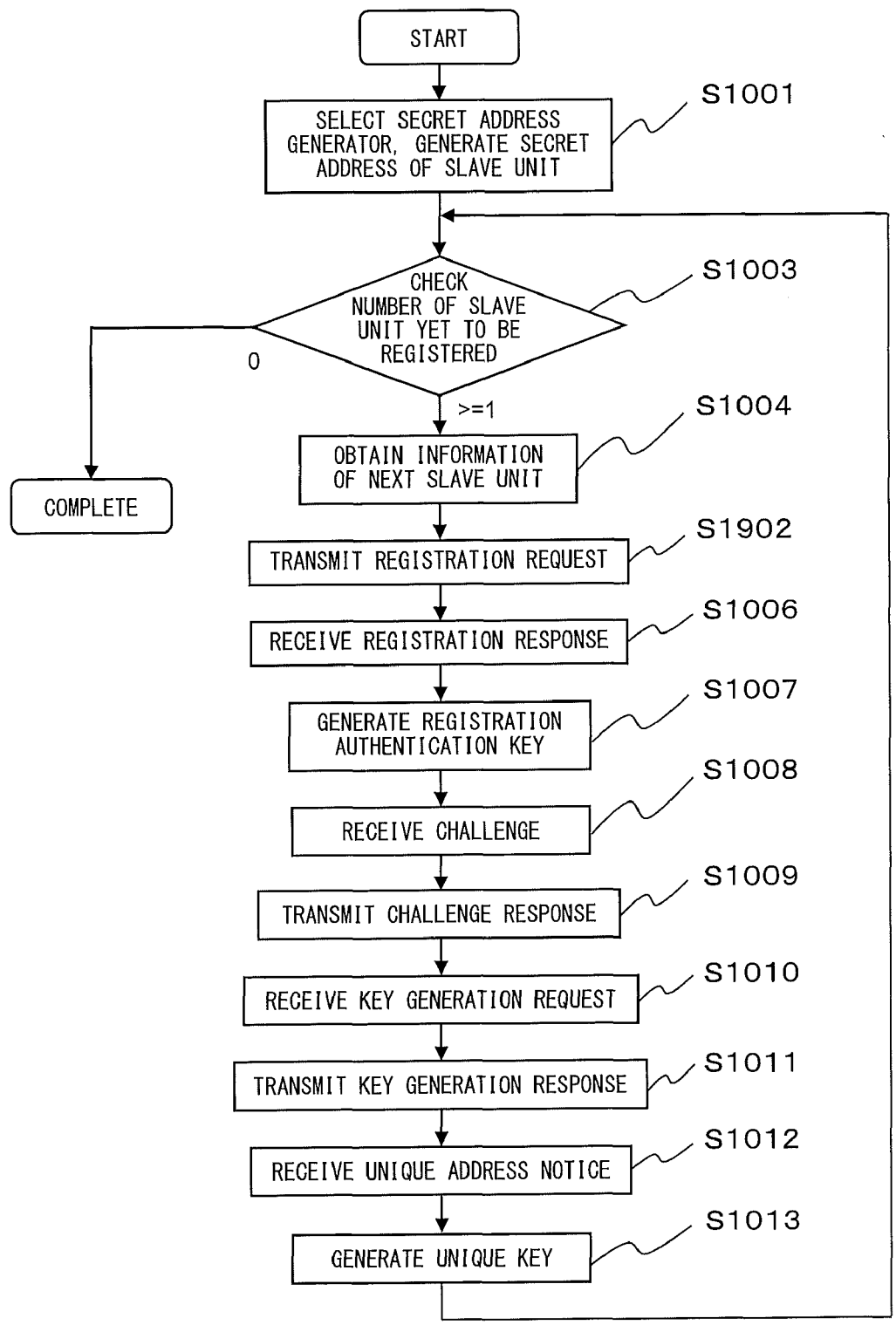
FIG. 19 is a flow chart showing a second re-registration process performed by the master unit 102.
Figure 20:
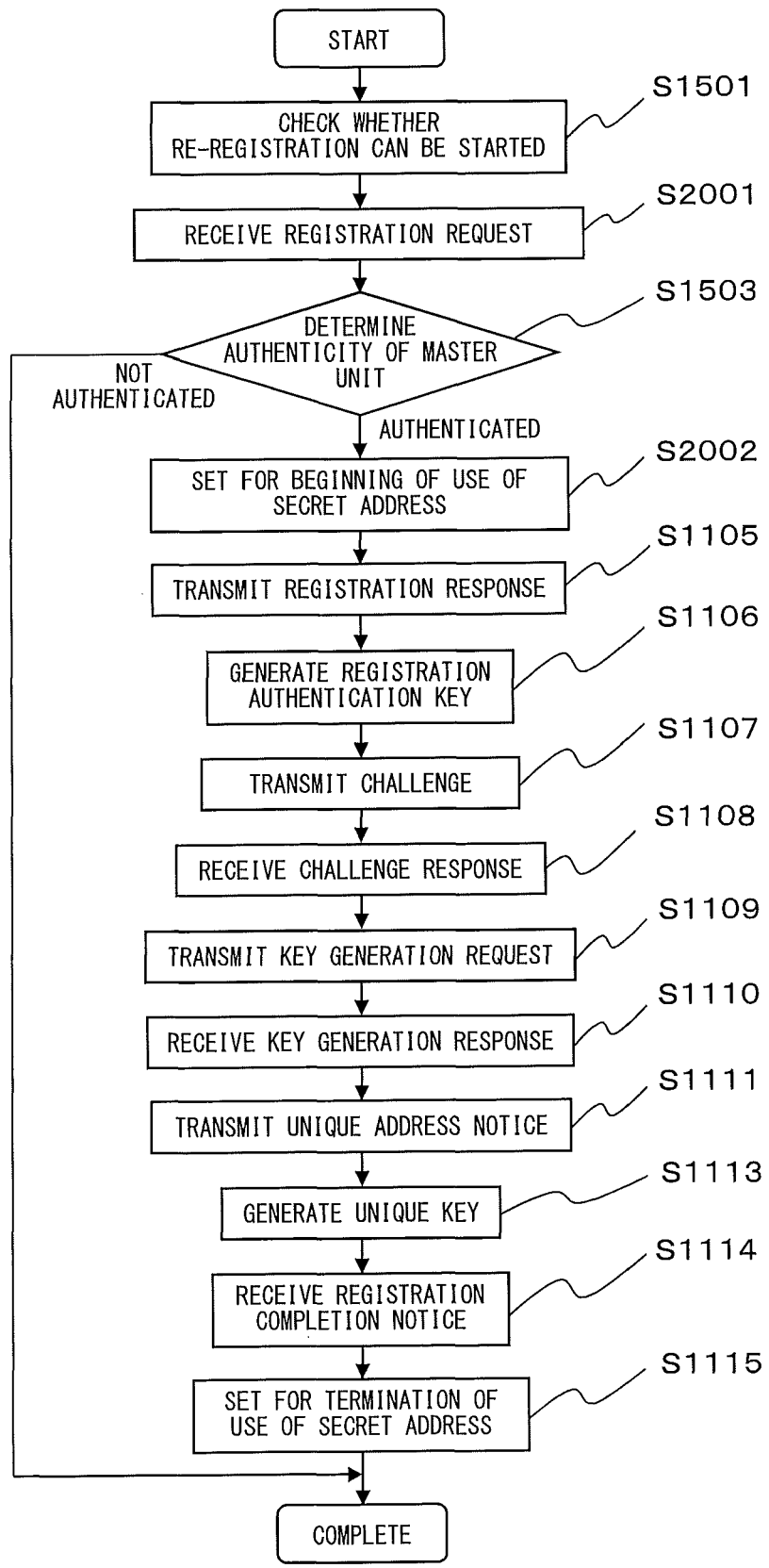
FIG. 20 is a flow chart showing a second re-registration process performed by each of the slave units 103a to 103n.

FIG. 19 is a flow chart showing a second re-registration process performed by the master unit 102. FIG. 20 is a flow chart showing a second re-registration process performed by each of the slave units 103a to 103n. In FIG. 19, among steps performed in the second re-registration process, steps which are the same as those performed in the first re-registration process are denoted by the same reference numerals as those in FIG. 14. The second re-registration process in FIG. 19 is different from the first re-registration process in FIG. 14 in that step S1014 and S1401 are omitted and that step S1902 is performed instead of step S1005.

In FIG. 20, among steps performed in the second re-registration process, steps which are the same as those performed in the first re-registration process are denoted by the same reference numerals as those in FIG. 15. The second re-registration process in FIG. 20 is different from the first re-registration process in FIG. 15 in that step S1502 and step S1104 are omitted, that step S2001 is added subsequent to step S1501, and that step S2002 is performed instead of step S1103.

FIG. 18 shows a figure showing a format of a registration request 1810 among messages exchanged between the master unit 102 and the slave unit 103 in the second re-registration process. Formats of other messages are not shown because these formats are the same as those of the messages exchanged in the first re-registration process.

In the following, among the steps performed in the second re-registration process, only steps different from those performed in the first re-registration process will be described, and descriptions of other steps are omitted In step S1902 (see FIG. 19), the master unit 102 transmits, to the secret address of the slave unit, a registration request 1810 (see FIG. 18) having stored therein a registration execution type 1812, a registration authentication key generation algorithm No. 1813, an encryption algorithm No. 1814 for encrypting messages exchanged in the subsequent registration process, a registration authentication key generator A1815, and registration certification information 1816. Here, the registration certification information 1816 is obtained by performing a calculation with respect to each field of the registration request shown above the registration request by using a one-way function (for example, Hash function), and encrypting a result of the calculation using the unique key of the slave unit.

In step S2001 (see FIG. 20), the slave unit 103 receives the registration request 1810 from the master unit 102. In step S1503 (see FIG. 20), the slave unit 103 performs, in the same manner as the master unit 102, a calculation by using a one-way function based on the received registration request 1810, generates registration certification information using the unique key of its own, and determines whether the same information as the generated registration certification information is contained in the registration request 1810. When the same information as the generated registration certification information is not contained in the registration request 1810, the slave unit 103 determines that the master unit 102 is not authenticated, and ignores the received registration start notice 1310, thereby terminating the re-registration process.

In step S1503 (see FIG. 15), on the other hand, when the same information as the generated registration certification information is contained in the registration request 1810, the slave unit 103 determines that the master unit 102 is authenticated and proceeds the processing to step S2002. In step S2002 (see FIG. 20), the slave unit 103 performs setting for beginning of use of the secret address. Other steps are the same as those performed in the first re-registration process, and thus descriptions thereof are omitted.

When the slave unit information list inputted from the setup device 101 to the master unit 102 contains the unique address of the slave unit, because the master unit 102 already retains the unique address of the slave unit, the slave unit 103 may not necessarily need to perform the process of step S1111. Other steps are the same as those performed in the first re-registration process, and thus descriptions thereof are omitted.

(7) A Selection Method of a Secret Address Generator and a Generation Method of a Secret Address In the following, a generation method of a secret MAC address, as an example of a secret address, is shown.

a secret MAC address (a portion indicating a serial ID):=Hash (a conversion master code)||identification information||a secret address generator)

Here, Hash represents a Hash function and is, for example, SHA-1. The conversion master code is a predetermined fixed character string. The secret address generator is random numbers selected by the master unit, or a combination of the random numbers and a BSSID. A different value is obtained every time the secret address generator is generated. The master unit determines whether there are any duplicates among calculated secret MAC addresses (serial IDs) of the slave units to be registered. When there is a duplicate, the master unit reselects the secret address generator and recalculates the secret MAC address of the corresponding slave unit. The entire secret MAC address consists of a vendor ID, a model number, and a serial ID. Here, the vendor ID and the model number are determined based on a common special identification value. The first 16 bits starting from the right of the above Hash value is adopted as the serial ID.

According to the above embodiment, when the slave unit 103 is newly added to the master unit 102, only by inputting the identification information of the slave unit 103 to the master unit 102, the registration process of the slave unit 103 is performed and the slave unit 103 can be connected to a existing network. Accordingly, a registration process of the slave unit 103 which can improve convenience for a user, shorten a time taken, and ensure security, can be provided.

Second Embodiment

In a second embodiment, procedures of an initial registration process and a re-registration process performed between a master unit 102 and each of slave units 103a to 103n are different from those in the first embodiment. Function block diagrams of the master unit 102 and the slave unit 103 are the same as those in the first embodiment, and thus descriptions will be made with reference to FIG. 4 and FIG. 5. In the following, only operations different from those in the first embodiment will be described.

Figure 21:
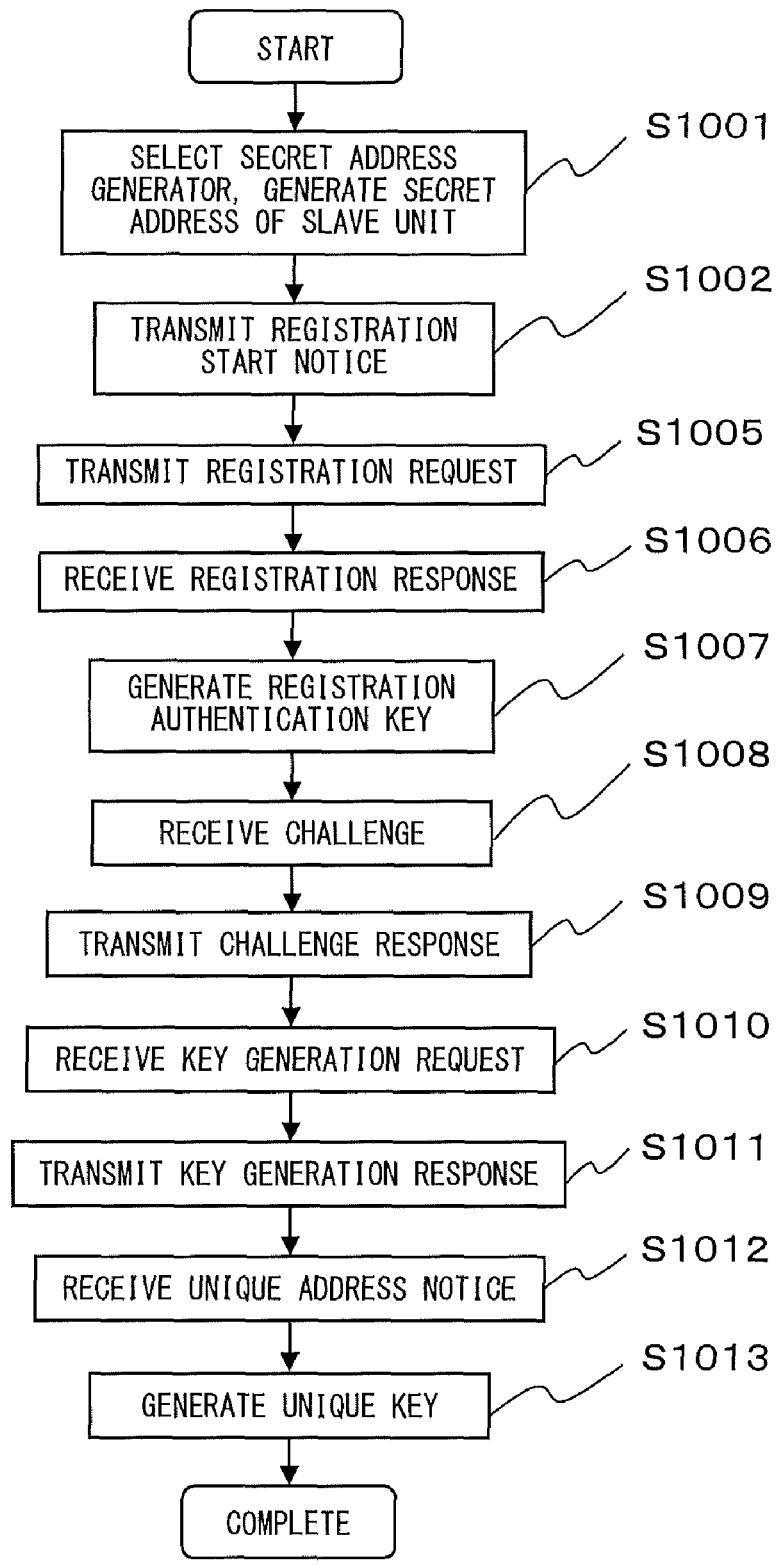
FIG. 21 is a flow chart showing an initial registration process performed by the master unit 102.
Figure 22:
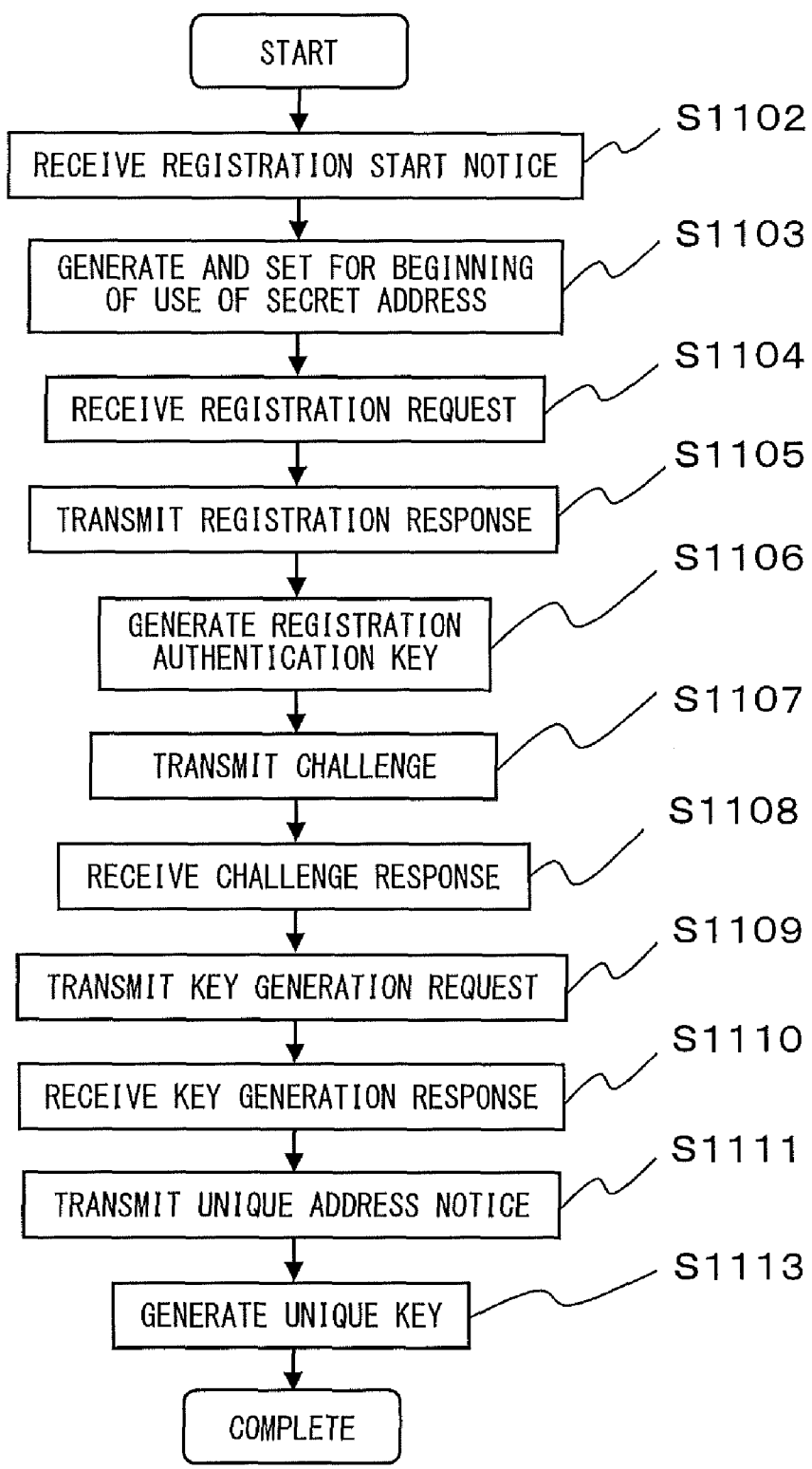
FIG. 22 is a flow chart showing an initial registration process performed by each of the slave units 103a to 103n.

FIG. 21 is a flow chart showing an initial registration process performed by a master unit 102 according to the second embodiment. In FIG. 21, the master unit 102 omits operations of step S1003, S1004, and S1014 which are performed in the initial registration process (see FIG. 10) according to the first embodiment. FIG. 22 is a flow chart showing an initial registration process performed by a slave unit 103 according to the second embodiment. In FIG. 22, the slave unit 103 omits operations of step S1101, S1114, and S1115 which are performed in the initial registration process (see FIG. 11) according to the first embodiment. In the following, the initial registration process according to the second embodiment will be described.

(1) Initial Registration Process

In step S1001 (see FIG. 21), based on identification information of the slave unit contained in the slave unit information list 814 in the registration start request 810 (see FIG. 8), the master unit 102 selects a secret address generator and generates a secret address of the slave unit.

In step S1002 (see FIG. 21), the master unit 102 transmits, to each of the slave units 103a to 103n, a registration start notice 910 (see FIG. 9) containing a secret address generator 913 by broadcast.

In step S1102 (see FIG. 22), each of the slave units 103a to 103n receives the registration start notice 910 from the master unit 102. Next, in step S1103 (see FIG. 22), each of the slave units 103a to 103n reads the secret address generator 913 from the received registration start notice 910, and generates a secret address of its own based on the read secret address generator 913 and the identification information of its own. Then, each of the slave units 103a to 103n performs setting for beginning of use of the generated secret address.

In step S1005 (see FIG. 21), the master unit 102 obtains information of a slave unit on which the master unit 102 performs the registration process from the slave unit information list 814. Here, it is assumed that information of the slave unit 103a is obtained. The master unit 102 transmits a registration request 920 (see FIG. 9) after describing therein, as a destination address, a secret address of the slave unit 103a contained in the information obtained in step S1004; the registration request 920 having stored therein a registration authentication key generation algorithm No. 922 representing an algorithm used for generating a registration authentication key; a encryption algorithm No. 923 representing an algorithm used for encrypting messages exchanged in the registration process; and a registration authentication key generator A924 which is information used for generating a registration authentication key.

In step S1104 (see FIG. 22), the slave unit 103a receives the registration request 920 in which the secret address of its own is described as the destination address. Next in step S1105, the slave unit 103a checks a content of each field of the received registration request 920 (see FIG. 9). When there is no error found, the slave unit 103a stores a registration authentication key generator B933 in a registration response 930 (see FIG. 9), and transmits the registration response 930 to the master unit 102.

In step S1006 (see FIG. 21), the master unit 102 receives the registration response 930 (see FIG. 9) transmitted by the slave unit 103a, then the master unit 102 proceeds the processing to step S1007. In step S1006, the master unit 102 checks a content of each field of the registration response 930. When there is any error found, the master unit 102 may stop the registration process with respect to the slave unit 103a and returns the processing to step S1005. Then, the master unit 102 may obtain, from the slave unit information list 814, information of a slave unit with respect to which the master unit 102 performs the registration process next, and transmit a registration request 920 to the slave unit. In step S1007 (see FIG. 21), the master unit 102 generates, from the registration authentication key generator A924 and the registration authentication key generator B933, a registration authentication key by using the registration authentication key generation algorithm which is specified by the registration authentication key generation algorithm No. 922.

In step S1106 (see FIG. 22), the slave unit 103a generates, from the registration authentication key generator A924 and the registration authentication key generator B933, a registration authentication key by using the registration authentication key generation algorithm which is specified by the registration authentication key generation algorithm No. 922. In step S1107 (see FIG. 22), the slave unit 103a transmits, to the master unit 102, a challenge 940 (see FIG. 9) having stored therein a plain text challenge 942 which is text data randomly generated, the text challenge 942 used for determining whether the common registration authentication key has been generated by the master unit 102 and the slave unit 103a.

In step S1008 (see FIG. 21), the master unit 102 receives the challenge 940 transmitted by the slave unit 103a, and encrypts the plain text challenge 942 in the received challenge 940 by using the registration authentication key based on the encryption algorithm specified by the encryption algorithm No. 923. Next in step S1009 (see FIG. 21), the master unit 102 transmits, to the slave unit 103a, a challenge response 950 (see FIG. 9) having stored therein an cipher text challenge 952.

In step S1108 (see FIG. 22), the slave unit 103a receives the challenge response 950 transmitted by the master unit 102. The slave unit 103a decrypts, based on the encryption algorithm specified by the encryption algorithm No. 923, the cipher text challenge 952 stored in the received challenge response 950 by using the registration authentication key. Then, the slave unit 103a compares the decrypted cipher text challenge 952 with the plain text challenge 942 which the slave unit 103a transmitted to the master unit 102 and determines whether the decrypted cipher text challenge 952 is identical with the plain text challenge 942. After confirming a result of the comparison, the slave unit 103a proceeds the processing to step S1109, and transmits, to the master unit 102, a key generation request 960 (see FIG. 9) having stored therein a unique key generation algorithm No. 962 and a unique key generator A963. In step S1108, when the result of the comparison is that the decrypted cipher text challenge 952 is not identical with the plain text challenge 942, the slave unit 103*a* may stop and terminate the registration process.

In step S1010 (see FIG. 21), the master unit 102 receives the key generation request 960 from the slave unit 103*a*, and proceeds the processing to step S1011. In step S1010, the master unit 102 checks a content of each field of the received key generation request 960. When there is any error found, the master unit 102 may stop the registration process with respect to the slave unit 103*a*, and return the processing to step S1005. Then, the master unit 102 may obtain, from the slave unit information list 814, information of a slave unit with respect to which the master unit 102 performs the registration process next and transmit a registration request 920 to the slave unit. In step S1011 (see FIG. 21), the master unit 102 transmits a key generation response 970 (see FIG. 9) having stored therein a unique key generator B973 and the like to the slave units 103.

In step S1110 (see FIG. 22), the slave unit 103*a* receives the key generation response 970. Next in step S1111 (see FIG. 22), the slave unit 130*a* encrypts the unique address of its own using the registration authentication key, and transmits a unique address notice 980 (see FIG. 9) having there in an encrypted unique address 982 which is the encrypted unique address of its own to the master unit 102.

In step S1012 (see FIG. 21), the master unit 102 receives the unique address notice 980 transmitted by the slave unit 103*a*. In step S1012, when the unique address notice 980 has not been properly received, the master unit 102 may stop the registration process with respect to the slave unit 103*a*, and return the processing to step S1005. Then, the master unit 102 may obtain, from the slave unit information list 814, information of a slave unit with respect to which the master unit 102 performs the registration process next, and transmit a registration request 920 to the slave unit.

In step S1013 (see FIG. 21), the master unit 102 generates, based on the unique key generator A963 and the unique key generator B973, a unique key of the slave unit 103 by using the specified unique key generation algorithm; and stores the generated unique key in association with the unique address or with the identification information of the slave unit 103 in the registration information storing section 405. When a plurality of slave units are contained in the slave unit information list 814, the master unit 102 may repeat, with respect to each of all the plurality of slave units, the registration process starting from step S1003 through to step S1013.

In step S1113 (see FIG. 22), the slave unit 103 generates, based on the unique key generator A963 and the unique key generator B973, the unique key of the slave unit 103 by using the specified unique key generation algorithm; and stores the generated unique key and the unique address of the master unit 102 in association with each other in the registration information storing section 504. Further, the slave unit 103*a* performs setting for termination of use of the secret address, thereby terminating the initial registration process. An example of the initial registration process performed between the master unit 102 and each of the slave units 103*a* to 103*n* has been described above. The slave unit 103*a* may perform the unique address notice transmission process in step S1111 after performing the unique key generation process in step S1113; encrypt the unique address of its own using the unique key; and transmit the unique address notice 980 (see FIG. 9) having stored therein the encrypted unique address 982 to master unit 102.

(5) First Re-registration Process

Figure 23:
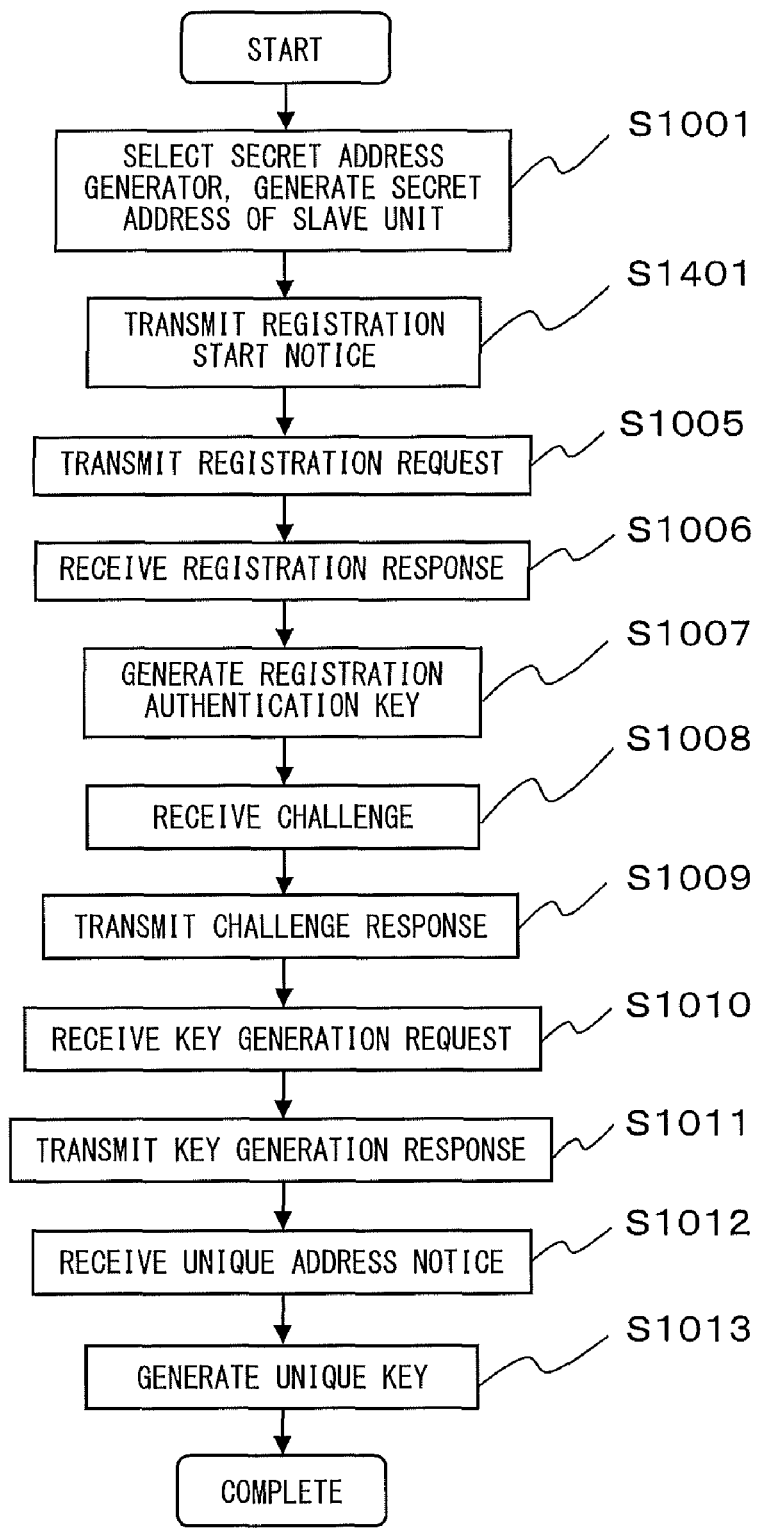
FIG. 23 is a flow chart showing a first re-registration process performed by the master unit 102.
Figure 24:
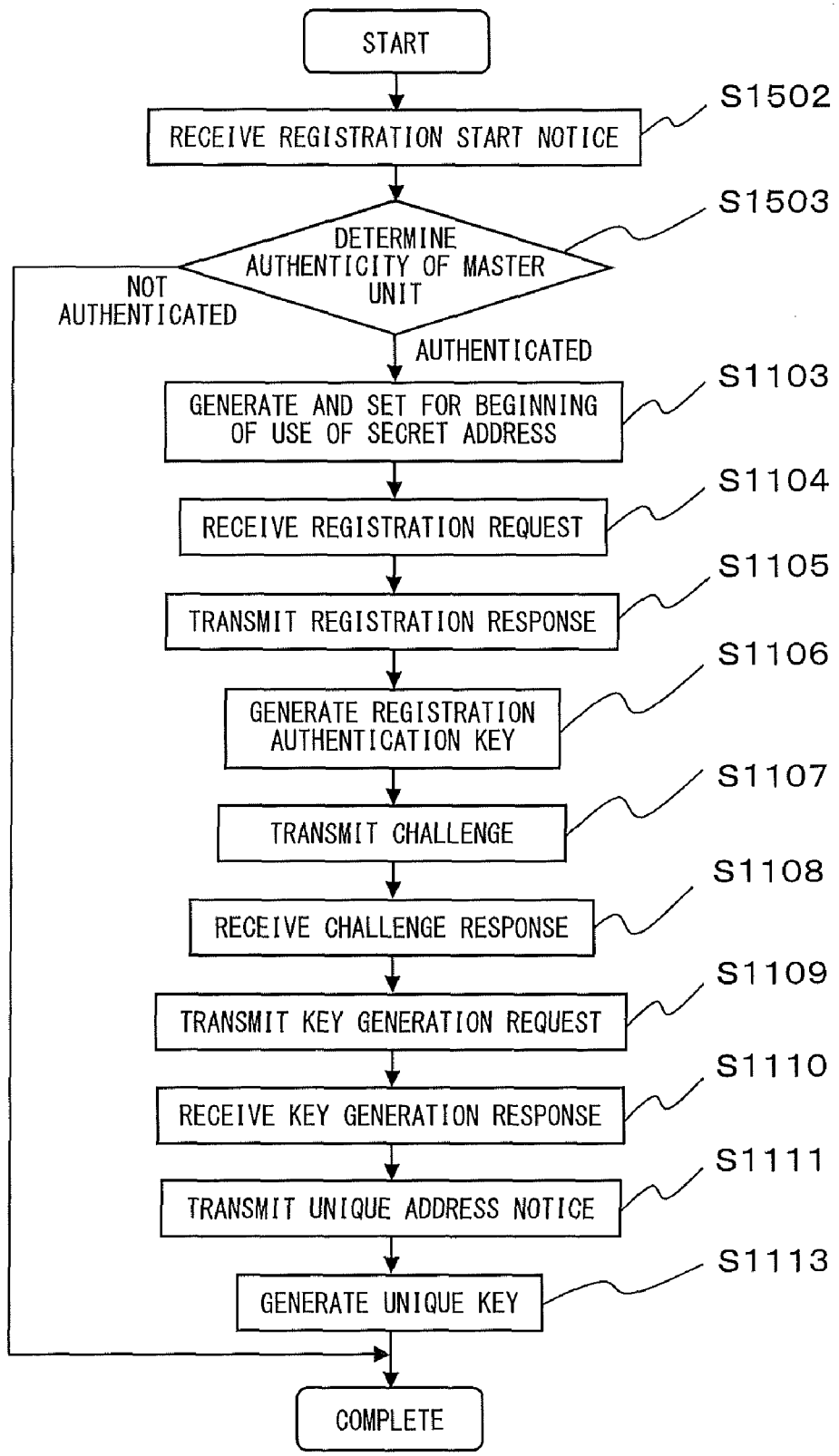
FIG. 24 is a flow chart showing a first re-registration process performed by each of the slave units 103a to 103n.

In the following, with respect to the first re-registration process according to the second embodiment, only operations different from those in the initial registration process will be described. FIG. 23 is a flow chart showing a first re-registration process performed by the master unit 102 according to the second embodiment. FIG. 24 is a flow chart showing a first re-registration process performed by each of the slave units 103*a* to 103*n* according to the second embodiment. In FIG. 23, among steps performed in the first re-registration process, steps which are the same as those performed in the initial registration are denoted by the same reference numerals as those in FIG. 21. The first re-registration process in FIG. 23 is different from the initial registration process in FIG. 21 in that step S1401 is performed instead of step S1002. The first re-registration process in FIG. 23 is equivalent to the first re-registration process (see FIG. 14) according to the first embodiment from which operations of step S1003, S1004, and S1014 are omitted.

In FIG. 24, among steps performed in the first re-registration process, steps which are the same as those performed in the initial registration process are denoted by the same reference numerals as those in FIG. 22. The first re-registration process in FIG. 24 is different from the first initial registration process in FIG. 22 in that step S1502 is performed instead of step S1102 and that step S1503 is added subsequent to step S1502. In other words, the first re-registration process in FIG. 24 is equivalent to the first re-registration process (see FIG. 15) according to the first embodiment from which operations of step S1501 and S1115 are omitted.

In the following, among the steps performed in the first re-registration process, only steps different from those performed in the initial registration process are described, and descriptions of other steps are omitted. In step S1401 (see FIG. 23), the master unit 102 transmits to each of the slave units 103*a* to 103*n* a registration start notice 1310 (see FIG. 13) having stored therein a secret address generator 1313, a unique address 1314 of a former master unit, and a registration certification information 1315 by broadcast. It is noted that, in the present embodiment, as the registration certification information 1315, a calculation is performed with respect to each of fields of the registration start notice 1310 shown above the registration certification information 1315 by using a one-way function (for example, Hash function); a result of the calculation is encrypted using a unique key of each slave unit; and the number of results of the encryption the same as the number of the slave 103*a* to 103*n* are stored.

In step S1502 (see FIG. 24), each of the slave units 103*a* to 103*n* receives the registration start notice 1310 from the master unit 102. Next in step S1503 (see FIG. 24), as in the same manner as the master unit 102, the slave unit 103 performs a calculation by using a one-way function; generates registration certification information from the received registration start notice 1310 by using the unique key of its own; and determines whether the same information as the generated registration certification information is contained in the registration start notice 1310. When the same information as the generated registration certification information is not contained in the registration start notice 1310, the slave unit 103 ignores the received registration start notice 1310, thereby terminating the re-registration process. In step S1503 (see FIG. 24), on the other hand, when the same information as the generated registration certification information is contained in the registration start notice 1310, the slave unit 103 determines that the master unit 102 is authenticated and proceeds the processing to step S1103. Then, the slave unit 103 generates a secret address of its own based on the secret address generator 1313 contained in the registration start notice 1310, and performs setting for beginning of use of the generated secret address. Other steps are the same as those performed in the initial registration process, and thus descriptions thereof are omitted.

When the unique address of the slave unit is contained in the information list of slave unit 103 inputted from the setup device 101 to the master unit 102, because the master unit 102 already stores the unique address of the slave unit, the slave unit 103 may not need to perform the process of step S1111. According to the present embodiment, the re-registration process of the master unit 102 performed when, such as, being replaced can be performed in a simple manner.

(6) Second Re-registration Process

Figure 25:
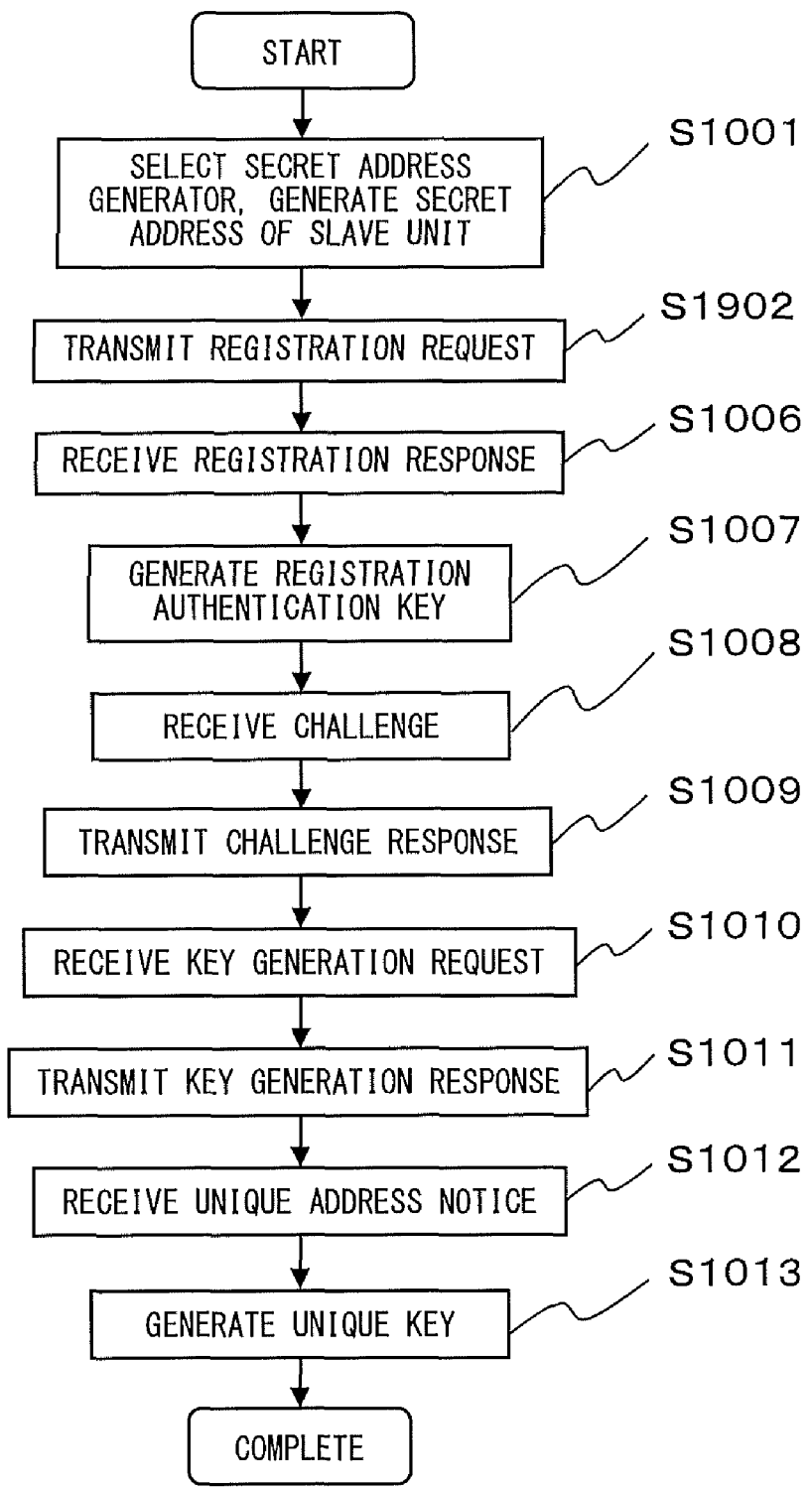
FIG. 25 is a flow chart showing a second re-registration process performed by the master unit 102.
Figure 26:
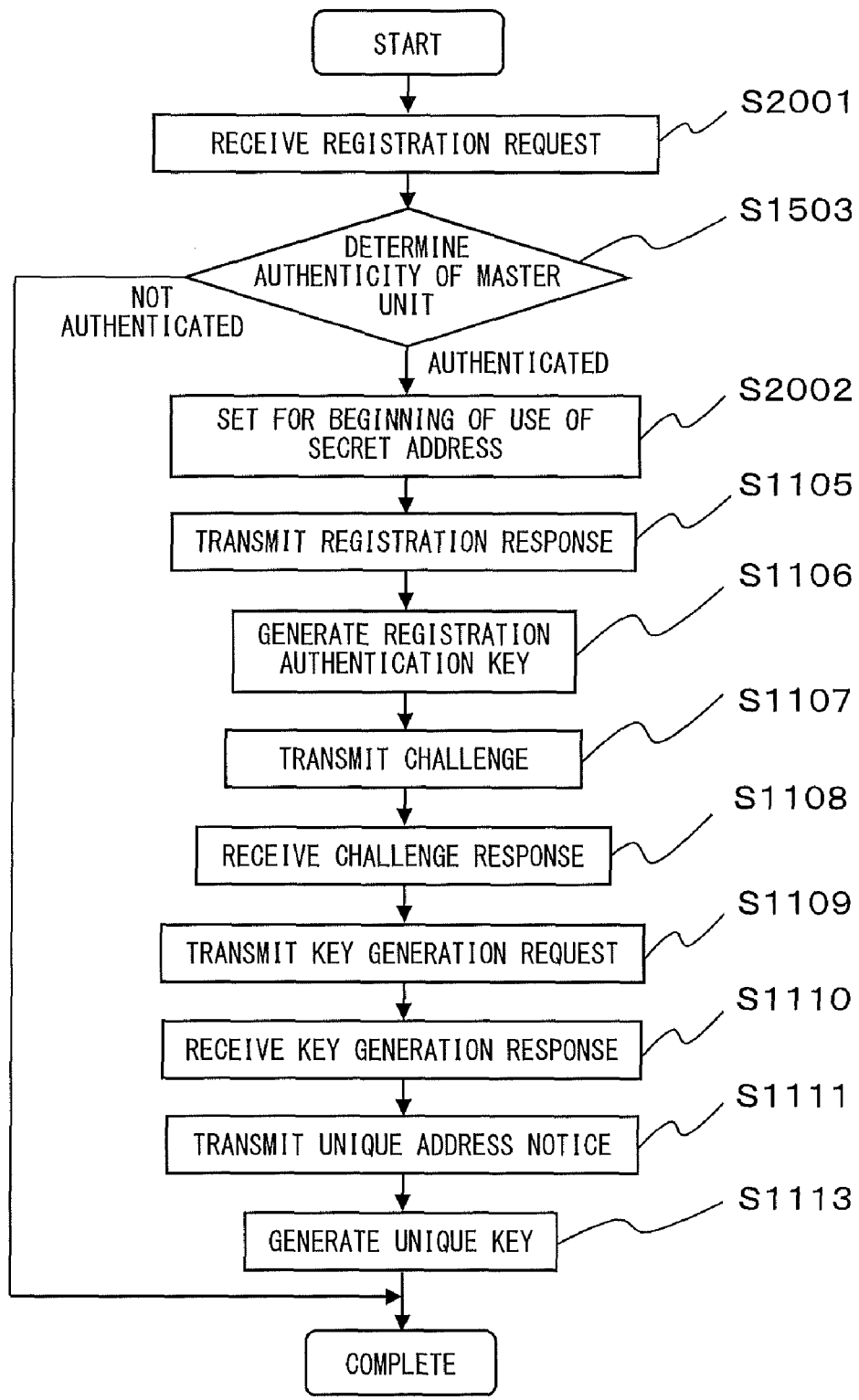
FIG. 26 is a flow chart showing a second re-registration process performed by each of the slave units 103a to 103n.

In the following, with respect to a second re-registration process according to the second embodiment, operations different from those in the first re-registration process will be described. FIG. 25 is a flow chart showing a second re-registration process performed by the master unit 102 according to the second embodiment. FIG. 26 is a flow chart showing a second re-registration process performed by each of the slave units 103*a* to 103*n* according to the second embodiment. In FIG. 25, among steps performed in the second re-registration process, steps which are the same as those performed in the first re-registration process are denoted by the same reference numerals as those in FIG. 23. The second re-registration process in FIG. 25 is different from the first re-registration process in FIG. 23 in that step S1401 is omitted and that step S1902 is performed instead of step S1005. The second re-registration process in FIG. 25 is equivalent to the second re-registration process (see FIG. 19) according to the first embodiment from which operations of step S1003 and S1004 are omitted.

In FIG. 26, among steps performed in the second re-registration process, steps which are the same as those performed in the first re-registration process are denoted by the same reference numerals as those in FIG. 24. The second re-registration process in FIG. 26 is different from the first re-registration process in FIG. 24, in that step S1502 and step S1104 are omitted, that step S2001 is added, and that step S2002 is performed instead of step S1103. In other words, the second re-registration process in FIG. 26 is equivalent to the second re-registration process (see FIG. 20) according to the first embodiment from which step S1501 and S1115 are omitted.

In the following, among the steps performed in the second re-registration process, only steps different from those performed in the first re-registration process will be described, and descriptions of other steps are omitted In step S1902 (see FIG. 25), the master unit 102 transmits, to the secret address of the slave unit, the registration request 1810 (see FIG. 18) having stored therein a registration execution type 1812, a registration authentication key generation algorithm No. 1813, a encryption algorithm No. 1814 for encrypting messages exchanged in the subsequent registration process, a registration authentication key generator A1815, and the registration certification information 1816. Here, the registration certification information 1816 is obtained by performing a calculation with respect to each of fields of the registration request 1810 shown above the registration certification information 1816 by using a one-way function (for example, Hash function), and encrypting each result of the calculation using the unique key of the slave unit.

In step S2001 (see FIG. 26), the slave unit 103 receives the registration request 1810 from the master unit 102. In step S2002 (see FIG. 20), the slave unit 103 performs setting for beginning of use of the secret address. Other steps are the same as those performed in the first re-registration process, and thus descriptions thereof are omitted.

When the slave unit information list inputted from the setup device 101 to the master unit 102 contains the unique address of the slave unit, because the master unit 102 already retains the unique address of the slave unit, the slave unit 103 may not necessarily need to perform the process of step S1111. Other steps are the same as those performed in the first re-registration process, and thus descriptions thereof are omitted.

Third Embodiment

Figure 27:
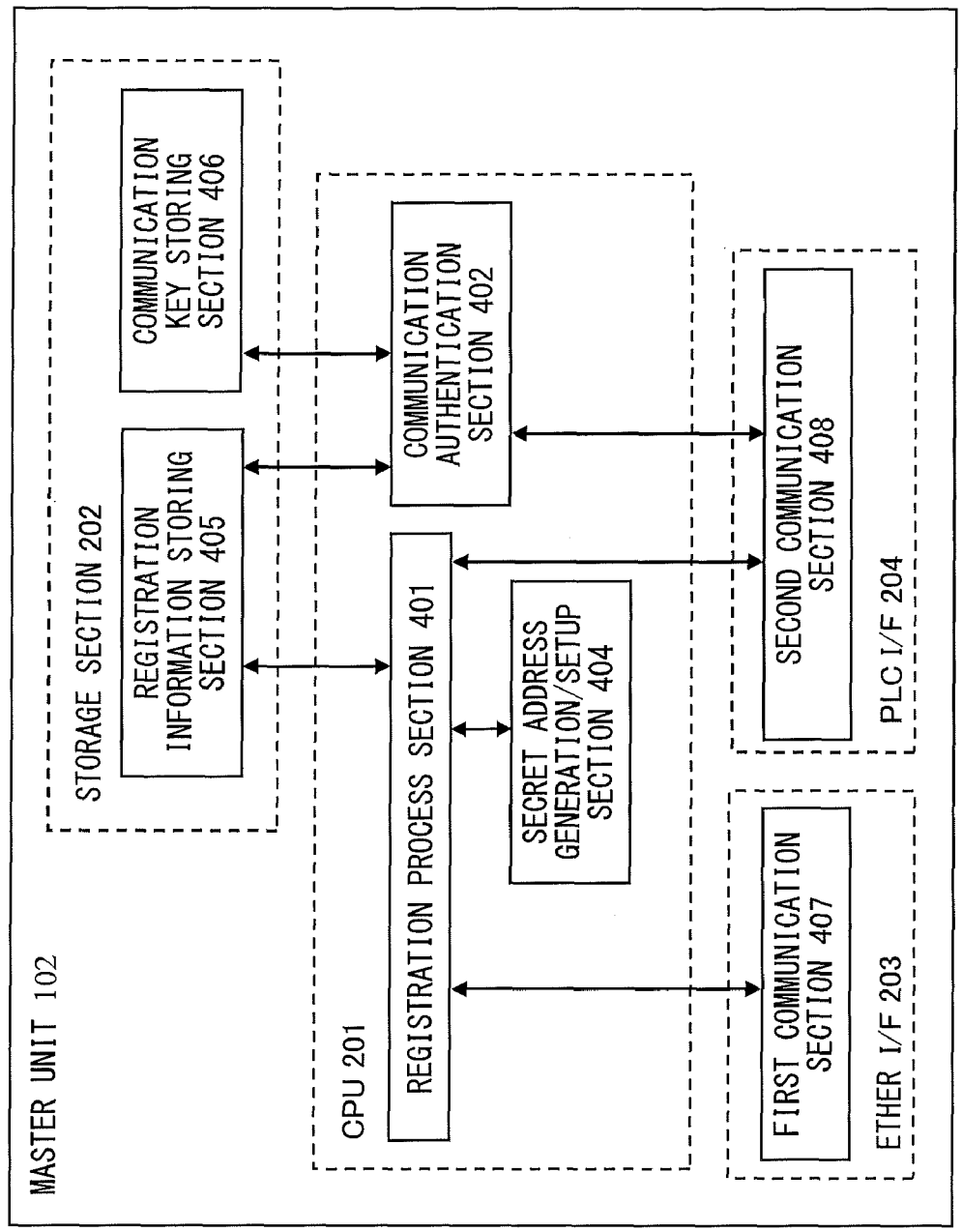
FIG. 27 is a function block diagram of the master unit 102.

In a third embodiment, description will be made of an authentication process performed so that a communication key is shared between a master unit and a slave unit which already share a unique key. Upon termination of the initial registration process, each of slave units 103*a* to 103*n* can specify a unique address of a master unit 102 as a destination address, request the master unit 102 for the authentication process, and receives a communication key from the master unit 102. In the following, in addition to the initial registration process and a re-registration process, configurations of the master unit 102 and the slave unit 103 which perform the authentication process will be described. FIG. 27 is a function block diagram of a master unit 102 according to the third embodiment. In FIG. 27, a CPU 201 has, in addition to functions of a registration process section 401 and a secret address generation and setup section 404, a function of a communication authentication section 402. A storage section 202 has, in addition to the function of a registration information storing section 405, a function of a communication key storing section 406. As in the same manner as the first embodiment and the second embodiment, an Ethernet I/F 203 has a function of a first communication section 407 and a PLC I/F 204 has a function of a second communication section 408.

The communication key storing section 406 stores a communication key of a network managed by the master unit 102. Upon receipt of a communication authentication request via the second communication section 408 from the slave unit 103 which has been registered, the communication authentication section 402 performs an authentication process with respect to the slave unit 103 based on a unique address and a unique key of the slave unit 103 stored in the registration information storing section 405. When a result of the authentication process is successful, the communication authentication section 402 assigns the communication key stored in the communication key storing section 406 to the slave unit 103.

Figure 28:
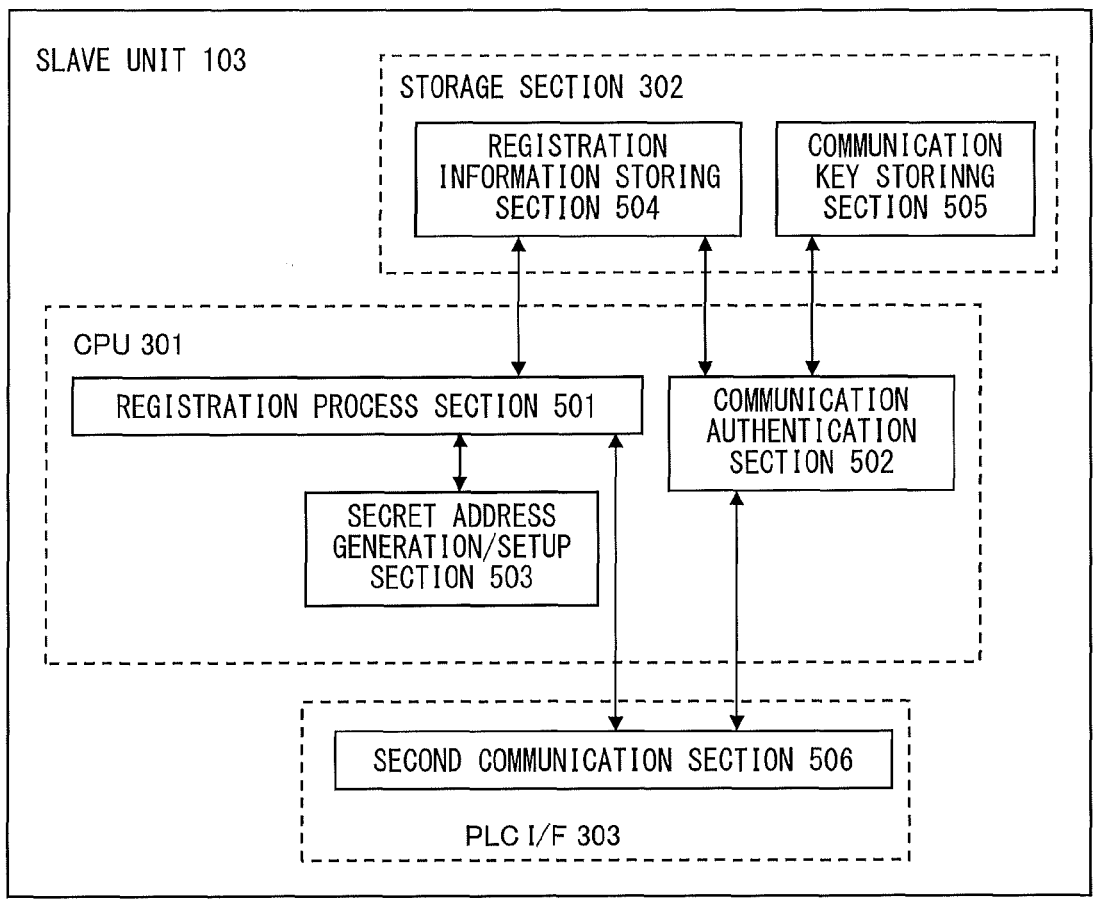
FIG. 28 is a function block diagram of the slave unit 103.

FIG. 28 is a function block diagram of a slave unit 103 according to the third embodiment. In FIG. 28, a CPU 301 has, in addition to functions of a registration process section 501 and a secret address generation and setup section 503, a function of a communication authentication section 502. A storage section 302 has, in addition to a function of a registration information storing section 504, a function of a communication key storing section 505. As in the manner same as the first embodiment and the second embodiment, a PLC I/F 303 has the function of the second communication section 506. The communication key storing section 505 stores the communication key assigned by the master unit 102. Upon termination of the registration process between the slave unit 103 and the master unit 102, the communication authentication section 502 transmits a communication authentication request to via the master unit 102 via the second communication section 506. When a communication key indicating that the slave unit 103 has been authenticated by the master unit 102 has been assigned, the communication authentication section 502 stores the communication key in the communication key storing section 505.

According to the above embodiment, also in the authentication process of the slave unit 103 performed after the registration process of the slave unit 103, even a large number of slave units 103 to be registered can be authenticated in a short time by using the common encryption key (unique key).

Figure 29:
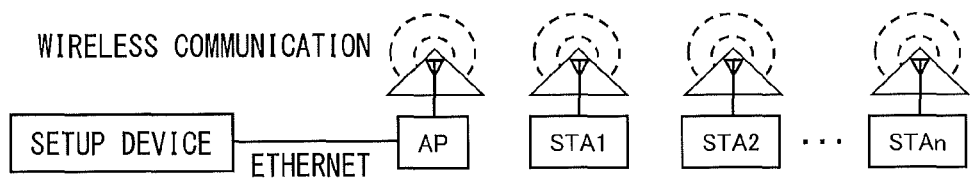
FIG. 29 shows a system configuration when setup is performed in a wireless communication network.
Figure 30:
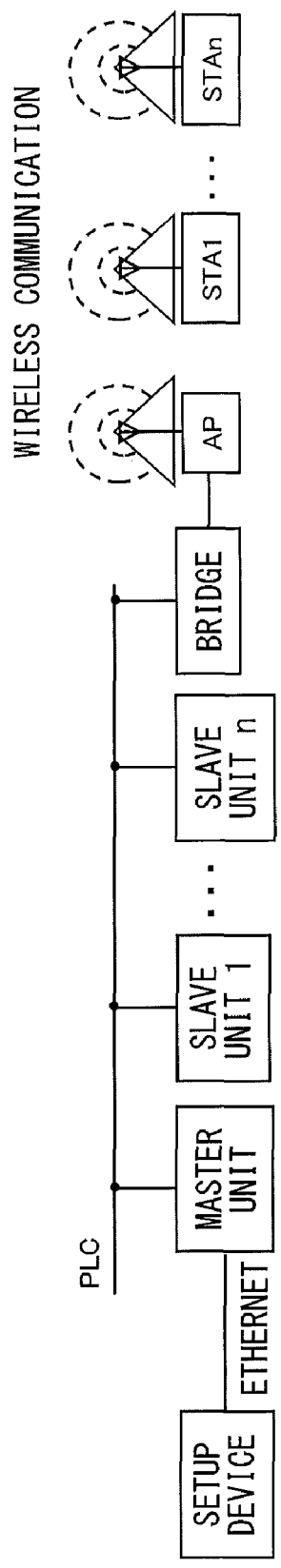
FIG. 30 shows a system configuration when a setup is performed in a network in which a PLC network is connected with a wireless communication network.

Although, in the above embodiments, an example where the present invention is applied to a PLC network has been described, the present invention is not limited to application to the PLC network. It is understood that the present invention is also applicable to the wireless network shown in FIG. 29 or other networks. When the present invention is applied to the wireless network, the master unit and the slave units each has a wireless I/F instead of a PLC I/F, and messages which are transmitted/received via the PLC network are transmitted/received via the wireless network. It is understood that, examples of a configuration of a network to which the present invention is applicable include a network in which a PLC network is connected with a wireless network by a bridge as shown in FIG. 30, and a network in which a plurality of PLC networks (not shown) are connected with one another with bridges, and a network in which a plurality of wireless networks (not shown) are connected with one another with bridges.

The steps performed by the respective functional blocks provided in each of the master unit and the slave unit disclosed in the embodiments of the present invention may be realized by a CPU interpreting and executing predetermined program data which is stored in a storage device (such as a ROM, a RAM, or a hard disk) and which enables execution of the above-described steps. In such a case, the program data may be introduced into the storage device via a storage medium, or may be executed directly on the storage medium. Here, the storage medium includes: a semiconductor memory such as a ROM, a RAM, and a flash memory; a magnetic disk memory such as a flexible disk and a hard disk; an optical disk memory such as a CD-ROM, a DVD, and a BD; a memory card; and the like. Further, the storage medium is a notion including a communication medium such as a phone line, a carrier path, and the like.

INDUSTRIAL APPLICABILITY

The communication devices and a registration method for the communication devices according to the present invention are capable of, for example, when new devices are added, securely connecting the new devices to the existing network, and are useful, for example, as a registration method and communication devices for performing setting a common secret key used in secret communication among the communication devices. The method disclosed in the present invention is applicable not only to a PLC network but also to any local communication network including a wireless communication network.

DESCRIPTION OF THE REFERENCE CHARACTERS

101 setup device
102 master unit
103 slave unit
201 CPU
202 storage section
203 Ethernet I/F
204 PLC I/F
301 CPU
302 storage section
303 PLC I/F
401 registration process section
402 communication authentication section
404 secret address generation and setup section
405 registration information storing section
406 communication key storing section
407 first communication section
408 second communication section
501 registration process section
502 communication authentication section
503 secret address generation and setup section
504 registration information storing section
505 communication key storing section
506 second communication section

The invention claimed is:

1. A master unit which manages registration of a slave unit, the master unit comprising:
  a first communication section which receives an input of identification information of the slave unit;
  a secret address generation and setup section including a processor which: selects a secret address generator having a value that varies every time the secret address generator is generated; and generates, based on the selected secret address generator and the identification information of the slave unit, a secret address of the slave unit to be used temporarily instead of a unique address of the slave unit;
  a second communication section which: transmits to and receives from the slave unit a notice relating to a registration process; transmits, to the slave unit, a registration start notice storing the secret address generator, the registration start notice being transmitted by a broadcast; and describes, when transmitting the notice relating to the registration process to the slave unit, the secret address of the slave unit and a unique address of the master unit as a destination address for the slave unit and a source address, respectively;
  a registration information storing section which stores registration information of the slave unit;
  a registration process section including a processor which: generates a registration authentication key to be used as an encryption key for encrypting communication with the slave unit; generates a unique key of the slave unit by transmitting to and receiving from the slave unit, unique key generation information encrypted using the generated registration authentication key; receives from the slave unit the unique address of the slave unit encrypted using one of the registration authentication key and the unique key of the slave unit; and stores the identification information of the slave unit, the unique address of the slave unit, and the unique key of the slave unit in association with one another in the registration information storing section.

2. The master unit according to claim 1, wherein the registration process section: transmits, to the slave unit, registration authentication key generation information as a registration request; receives, from the slave unit, registration authentication key generation information as a registration response; and generates the registration authentication key based on the transmitted registration authentication key generation information, the received registration authentication key generation information, and the identification information of the slave unit.

3. The master unit according to claim 2, wherein the registration process section: receives a plain text challenge from the slave unit; and confirms, by transmitting to the slave unit a cipher text challenge obtained by encrypting the received plain text challenge using the registration authentication key, that a common registration authentication key has been generated by the master unit and the slave unit.

4. The master unit according to claim 1, wherein the registration process section: receives, from the slave unit, the unique key generation information encrypted using the registration authentication key as a key generation request; transmits, to the slave unit, the unique key generation information encrypted using the registration authentication key as a key generation response; and generates the unique key of the slave unit based on the received unique key generation information and the transmitted unique key generation information.

5. The master unit according to claim 4, wherein the registration process section: decrypts, upon receipt from the slave unit of a unique address notice indicating an encrypted unique address of the slave unit, the encrypted unique address of the slave unit using one of the registration authentication key and the unique key of the slave unit; and stores the identification information of the slave unit, the unique address of the slave unit, and the unique key of the slave unit in association with one another in the registration information storing section, so as to terminate the registration process of the slave unit.

6. The master unit according to claim 5, wherein the registration process section, upon termination of the registration process with respect to all of slave units connected with the master unit, transmits to each slave unit a registration termination notice indicating a termination of use of the secret address, the notice indicating the termination of use being transmitted by a broadcast.

7. The master unit according to claim 1, wherein the registration process section: determines whether the identification information of the slave unit, the unique address of the slave unit, and the unique key of the slave unit are present in the registration information storing section; and, when a result of the determination is that the identification information of the slave unit, the unique address of the slave unit, and the unique key of the slave unit are present, updates only the unique key of the slave unit while retaining the identification information of the slave unit and the unique address of the slave unit.

8. A slave unit connected with a master unit which manages registration of the slave unit, the slave unit comprising:
a communication section which: transmits to and receives from the master unit a notice relating to a registration process; receives, from the master unit, a registration start notice storing a secret address generator having a value that varies every time the secret address generator is generated; and describes, when transmitting the notice relating to the registration process to the master unit, a secret address of the slave unit generated based on the secret address generator and a unique address of the master unit as a source address for the slave unit and a destination address, respectively;
a secret address generation and setup section including a processor which generates, based on the secret address generator received from the master unit and identification information of the slave unit, the secret address of the slave unit to be used temporarily instead of a unique address of the slave unit;
a registration information storing section which stores information relating to the master unit;
a registration process section including a processor which: generates a registration authentication key to be used as an encryption key for encrypting communication with the master unit; generates a unique key of the slave unit by transmitting to and receiving from the master unit, unique key generation information encrypted using the generated registration authentication key; transmits, to the master unit, the unique address of the slave unit encrypted using one of the registration authentication key and the unique key of the slave unit; and stores the unique key of the slave unit and the unique address of the master unit in association with each other in the registration information storing section.

9. The slave unit according to claim 8, wherein the registration process section: receives, from the master unit, registration authentication key generation information as a registration request; transmits, to the master unit, registration authentication key generation information as a registration response; and generates the registration authentication key based on the received registration authentication key generation information, the transmitted registration authentication key generation information, and the identification information of the slave unit.

10. The slave unit according to claim 9, wherein the registration process section: transmits, to the master unit, a randomly generated plain text challenge; decrypts a cipher text challenge received from the master unit into a plain text challenge using the registration authentication key; and confirms, when the generated plain text challenge is identical with the plain text challenge into which the cipher text challenge has been decrypted, that the common registration authentication key has been generated by the master unit and the slave unit.

11. The slave unit according to claim 8, wherein the registration process section: transmits, to the master unit, the unique key generation information encrypted using the registration authentication key as a key generation request; receives, from the master unit, the unique key generation information encrypted using the registration authentication key as a key generation response; and generates the unique key of the slave unit based on the transmitted unique key generation information and the received unique key generation information.

12. The slave unit according to claim 11, wherein the registration process section: encrypts, upon receipt from the master unit of the key generation response, the unique address of the slave unit using one of the registration authentication key and the unique key of the slave unit; and transmits, to the master unit, a unique address notice storing the encrypted unique address of the slave unit.

13. The slave unit according to claim 12, wherein the registration process section stores the unique key of the slave unit and the unique address of the master unit in association with each other in the registration information storing section.

14. The slave unit according to claim 13, wherein the registration process section, upon receipt from the master unit of a registration termination notice indicating a termination of use of the secret address, terminates use of the secret address.

15. The slave unit according to claim 12, wherein the registration process section: determines whether the unique address of the master unit and the unique key of the slave unit are stored in the registration information storing section; and determines, when a result of the determination is that the unique address of the master unit and the unique key of the slave unit are stored, that the master unit already retains the unique address of the slave unit, so as to not transmit the unique address notice to the master unit.

16. A method in which a master unit manages registration of a slave unit, the master unit including a registration information storing section which stores registration information of the slave unit, and the method comprising:
selecting a secret address generator having a value that varies every time the secret address generator is generated, and generating, based on the selected secret address generator and identification information of the slave unit, a secret address of the slave unit to be used temporarily instead of a unique address of the slave unit;

transmitting, to the slave unit, a registration start notice storing the secret address generator, the registration start notice being transmitted by a broadcast;

transmitting to and receiving from the slave unit a notice relating to a registration process;

describing, when transmitting the notice relating to the registration process to the slave unit, the secret address of the slave unit and a unique address of the master unit as a destination address for the slave unit and a source address, respectively;

generating a registration authentication key to be used as an encryption key for encrypting communication with the slave unit and transmitting to and receiving from the slave unit unique key generation information encrypted using the generated registration authentication key;

receiving the unique address of the slave unit encrypted using the registration authentication key from the slave unit;

generating a unique key of the slave unit based on the unique key generation information; and storing the identification information of the slave unit, the unique address of the slave unit, and the unique key of the slave unit in association with one another in the registration information storing section.

17. A method in which a slave unit connected with a master unit which manages registration of the slave unit identifies the master unit, the slave unit comprising a registration information storing section which stores information relating to the master unit, the method comprising:

receiving, from the master unit, a registration start notice having stored therein a secret address generator having a value that varies every time the secret address generator is generated, generating, based on the secret address generator received from the master unit and identification information of the slave unit, a secret address of the slave unit to be used temporarily instead of a unique address of the slave unit;

describing, when transmitting a notice relating to a registration process to the master unit, the secret address of the slave unit and a unique address of the master unit as a source address for the slave unit and a destination address, respectively;

generating a registration authentication key to be used as an encryption key for encrypting communication with the master unit;

transmitting to and receiving from the master unit, unique key generation information encrypted using the generated registration authentication key;

transmitting, to the master unit, the unique address of the slave unit encrypted using the registration authentication key;

generating a unique key of the slave unit; and storing the unique key of the slave unit and the unique address of the master unit in association with each other in the registration information storing section.

* * * * *